US009656201B2

(12) United States Patent
Gencer et al.

(10) Patent No.: US 9,656,201 B2
(45) Date of Patent: May 23, 2017

(54) SMART, ON-DEMAND CONTROLLED RELEASE CORROSION PROTECTION AND/OR PREVENTION OF METALS IN AN ENCLOSURE

(71) Applicant: NORTHERN TECHNOLOGIES INTERNATIONAL CORPORATION, Beachwood, OH (US)

(72) Inventors: Mehmet A. Gencer, Brecksville, OH (US); Efim Ya Lyublinski, Solon, OH (US)

(73) Assignee: Northern Technologies International Corporation, Beachwood, OH (US)

( * ) Notice: Subject to any disclaimer, the term of this patent is extended or adjusted under 35 U.S.C. 154(b) by 247 days.

(21) Appl. No.: 14/582,393

(22) Filed: Dec. 24, 2014

(65) Prior Publication Data

US 2016/0184759 A1 Jun. 30, 2016

(51) Int. Cl.
| | | |
|---|---|---|
| *B01D 53/02* | (2006.01) | |
| *B01D 53/04* | (2006.01) | |
| *B01D 53/26* | (2006.01) | |
| *C23F 11/02* | (2006.01) | |

(Continued)

(52) U.S. Cl.
CPC .......... *B01D 53/04* (2013.01); *B01D 53/261* (2013.01); *C23F 11/00* (2013.01); *C23F 11/02* (2013.01); *C23F 15/00* (2013.01); *B01D 2253/104* (2013.01); *B01D 2253/106* (2013.01); *B01D 2253/112* (2013.01); *B01D 2253/116* (2013.01);
(Continued)

(58) Field of Classification Search
CPC ........ B01D 2253/104; B01D 2253/106; B01D 2253/112; B01D 2253/116; B01D 2253/20; B01D 2259/10; B01D 53/04; B01D 53/261; C23F 11/00; C23F 11/02; C23F 15/00
See application file for complete search history.

(56) References Cited

U.S. PATENT DOCUMENTS

| 5,958,115 A | 9/1999 | Bottcher et al. |
|---|---|---|
| 6,358,397 B1 | 3/2002 | Lyublinski |
| 6,387,244 B1 | 5/2002 | Lyublinski |

(Continued)

FOREIGN PATENT DOCUMENTS

WO    03 012159 A2    2/2003

OTHER PUBLICATIONS

International Search Report dated Feb. 23, 2016 for corresponding international application PCT/US2015/064924.

*Primary Examiner* — Christopher P Jones
(74) *Attorney, Agent, or Firm* — Hudak, Shunk & Farine Co. LPA

(57) ABSTRACT

A smart enclosure protection system for packages containing one or more metals comprises various sensors such as relative humidity, temperature of the metal, temperature within the package, a volatile corrosion inhibitor sensor, as well as a relative humidity sensor. Upon a computer receiving a signal from one or more of the noted sensors that the sensing item is either above or below a predetermined value, it will send a signal to one or more dispensers such as a dehumidifying compound dispenser, a volatile corrosion inhibitor compound dispenser, a soluble corrosion inhibitor compound dispenser, or a chemical fluid absorber or scavenger dispenser to dispense one or more such dispensing compounds that abates or removes an actual or a potential corrosion inhibiting situation.

19 Claims, 15 Drawing Sheets

(51) Int. Cl.
*C23F 11/00* (2006.01)
*C23F 15/00* (2006.01)

(52) U.S. Cl.
CPC ...... *B01D 2253/20* (2013.01); *B01D 2259/10* (2013.01)

(56) References Cited

U.S. PATENT DOCUMENTS

| | | |
|---|---|---|
| 6,419,816 B1 | 7/2002 | Lyublinski |
| 6,444,595 B1 | 9/2002 | Elkouh et al. |
| 6,551,552 B1 | 4/2003 | Lyublinski et al. |
| 6,794,317 B2 | 9/2004 | Elkouh et al. |
| 6,833,334 B1 | 12/2004 | Elkouh et al. |
| 7,053,012 B2 | 5/2006 | Elkouh et al. |
| 7,183,230 B2 | 2/2007 | Elkouh et al. |
| 7,261,839 B2 | 8/2007 | Kubik et al. |
| 7,270,775 B2 | 9/2007 | Kubik et al. |
| 7,759,265 B2 | 7/2010 | Elkouh et al. |
| 7,763,213 B2 | 7/2010 | Miksic et al. |
| 7,794,583 B2 | 9/2010 | Lyublinski |
| 7,838,445 B2 | 11/2010 | Vido |
| 8,017,203 B2 | 9/2011 | Lyublinski et al. |
| 8,021,737 B2 | 9/2011 | Elkouh et al. |
| 8,071,200 B2 | 12/2011 | Lyublinski et al. |
| 8,309,021 B2 | 11/2012 | Lyublinski et al. |
| 8,348,058 B2 | 1/2013 | Stottmeister |
| 8,354,072 B2 | 1/2013 | Lyublinski et al. |
| 8,377,531 B2 | 2/2013 | Lyublinski et al. |
| 8,418,757 B2 | 4/2013 | Lyublinski et al. |
| 2002/0134690 A1 | 9/2002 | Lyublinski |
| 2003/0019872 A1 | 1/2003 | Lyublinski et al. |
| 2003/0207103 A1 | 11/2003 | Zvosec et al. |
| 2003/0207974 A1 | 11/2003 | Kubik et al. |
| 2003/0213936 A1 | 11/2003 | Kubik et al. |
| 2003/0220436 A1 | 11/2003 | Gencer et al. |
| 2004/0157018 A1 | 8/2004 | Lyublinski et al. |
| 2004/0173779 A1 | 9/2004 | Gencer et al. |
| 2006/0099247 A1 | 5/2006 | Cantwell et al. |
| 2008/0118419 A1 | 5/2008 | Lyublinski et al. |
| 2008/0247921 A1 | 10/2008 | Lyublinski |
| 2011/0260443 A1 | 10/2011 | Lyublinski et al. |
| 2012/0015161 A1 | 1/2012 | Todt et al. |
| 2012/0040151 A1 | 2/2012 | Lyublinski et al. |
| 2012/0058294 A1 | 3/2012 | Todt et al. |
| 2012/0171409 A1 | 7/2012 | Todt et al. |
| 2012/0275951 A1 | 11/2012 | Lyublinski et al. |
| 2013/0186617 A1 | 7/2013 | Lyublinski et al. |
| 2014/0026648 A1 | 1/2014 | Schmitz et al. |

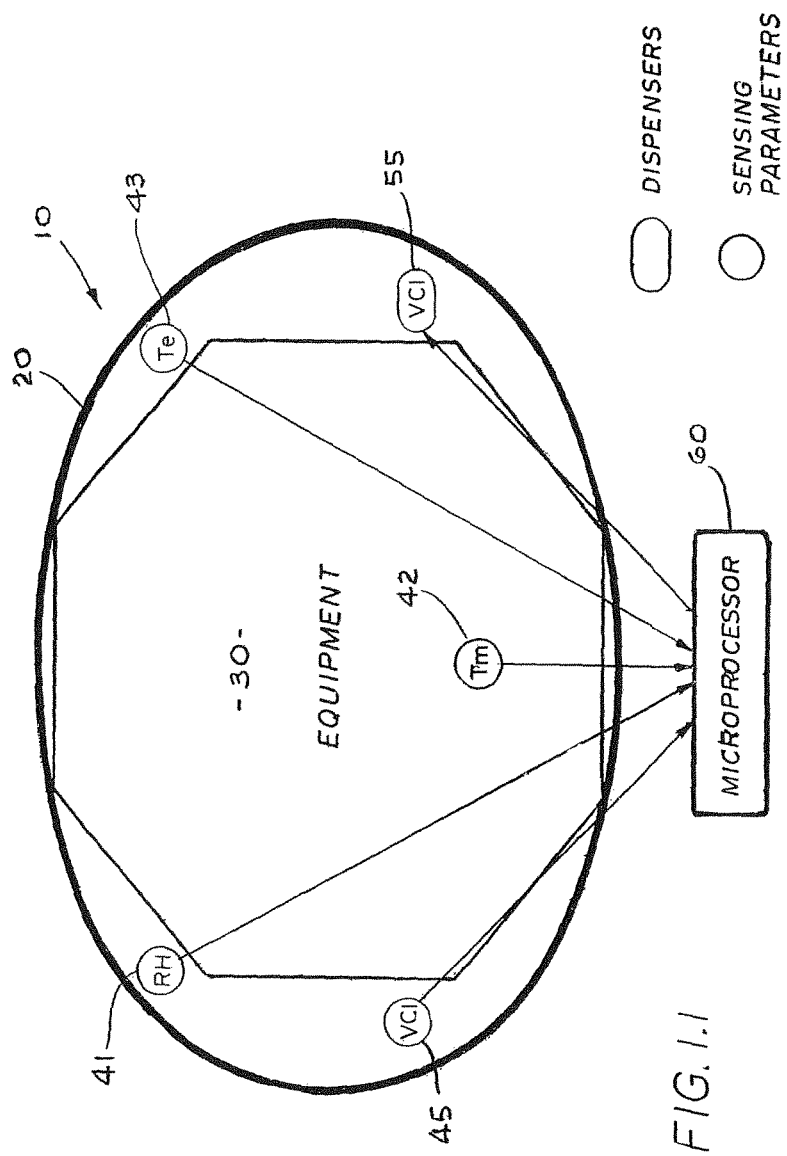
FIG. 1.1

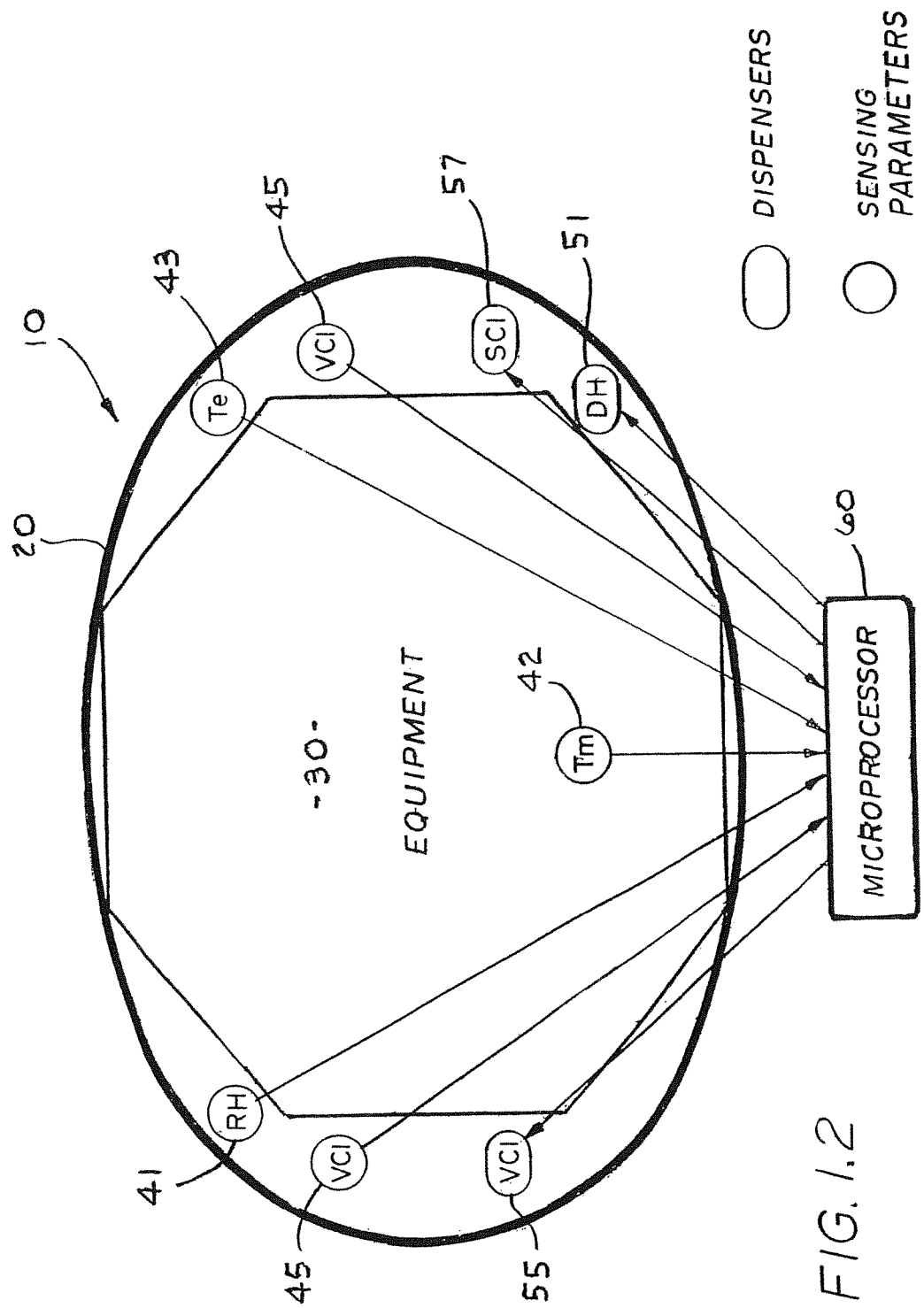
FIG. 1.2

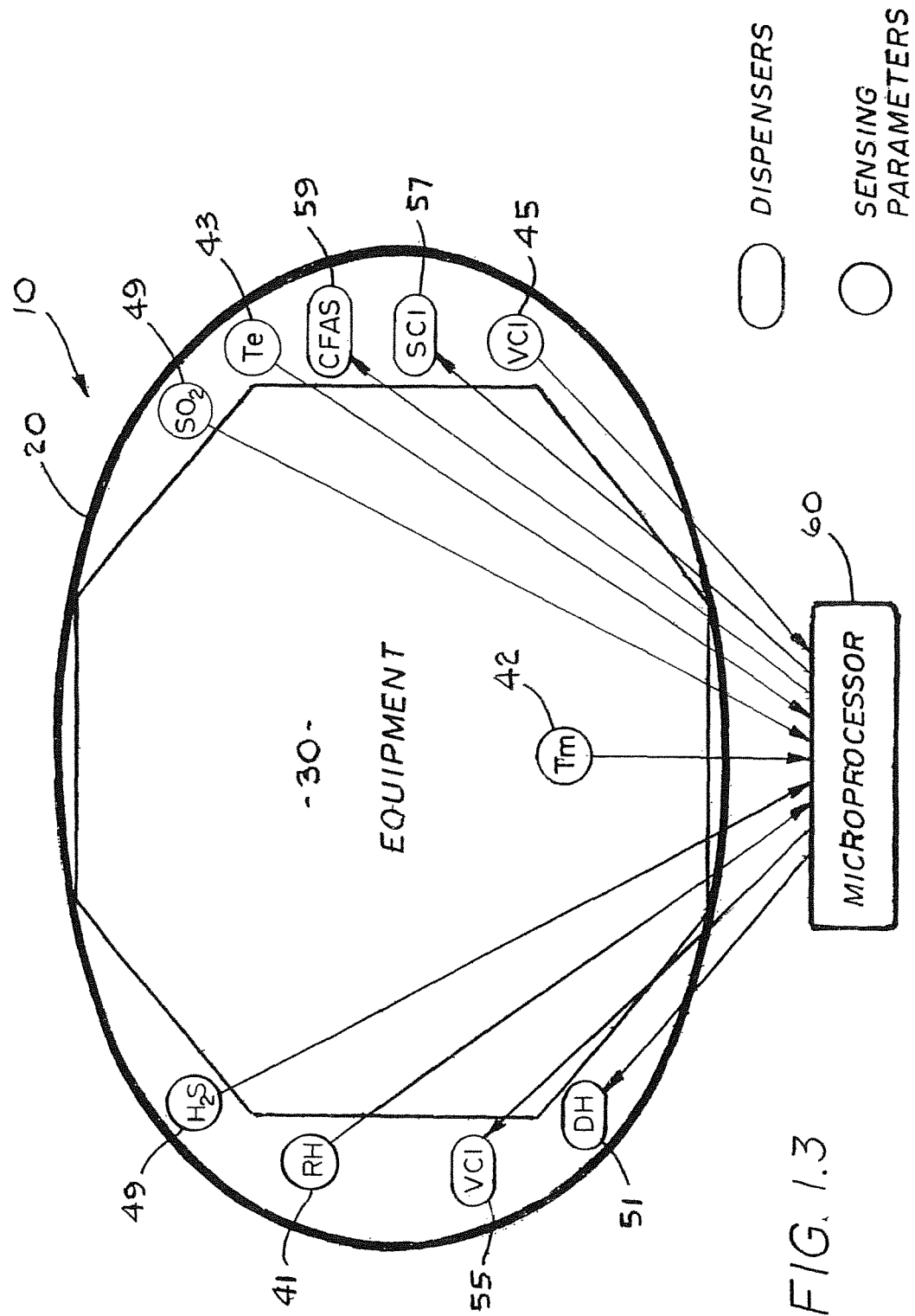
FIG. 1.3

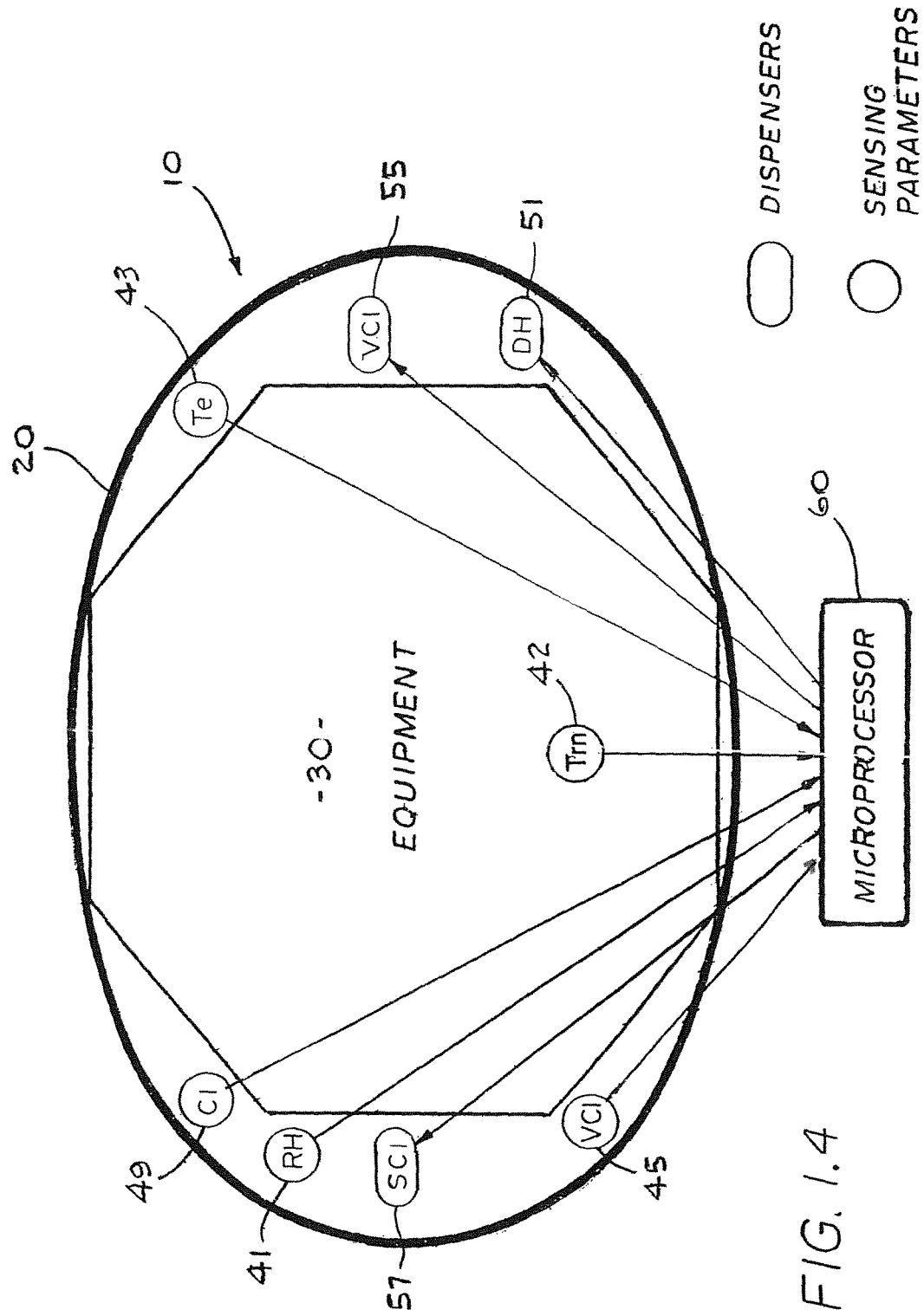
FIG. 1.4

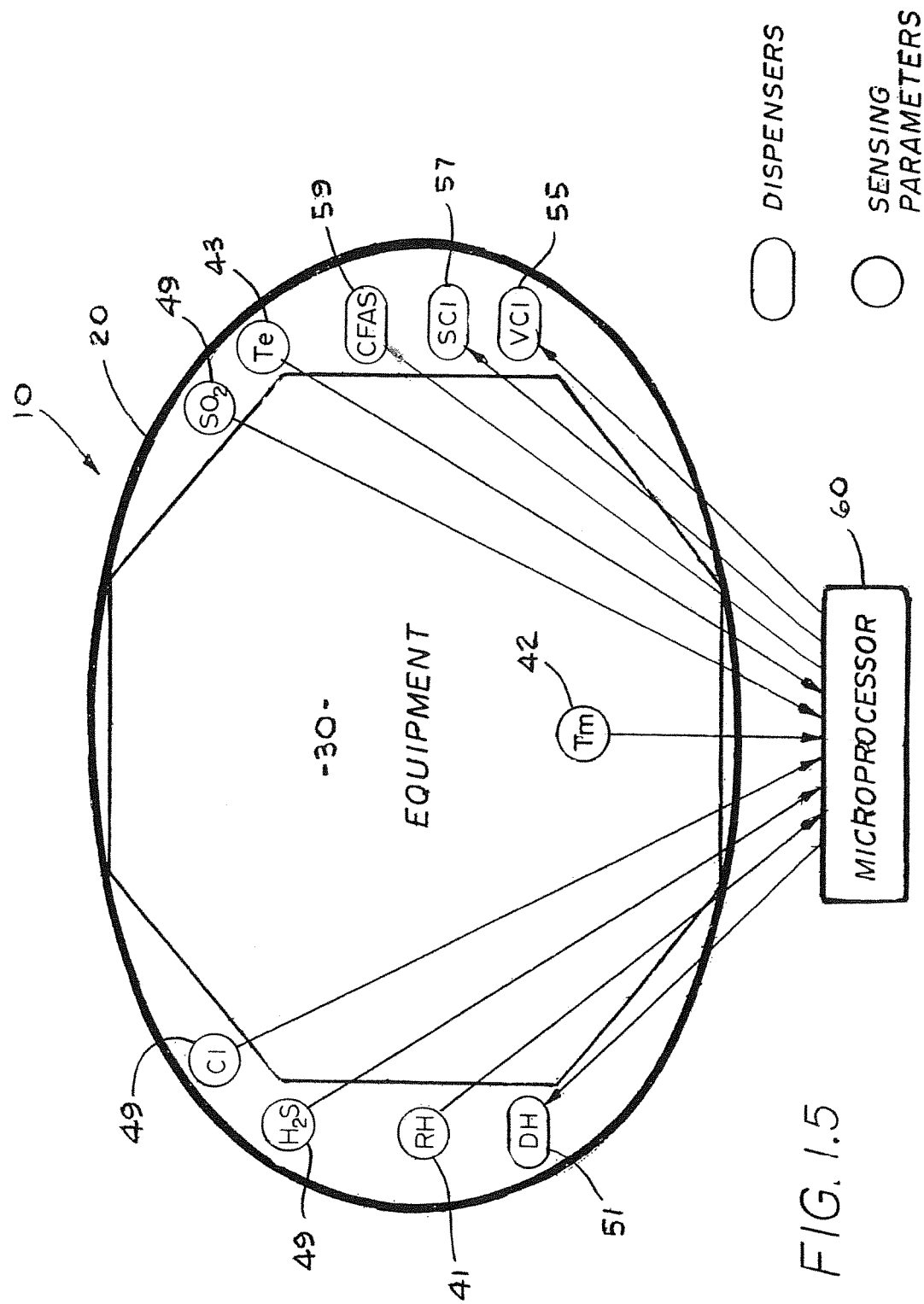
FIG. 1.5

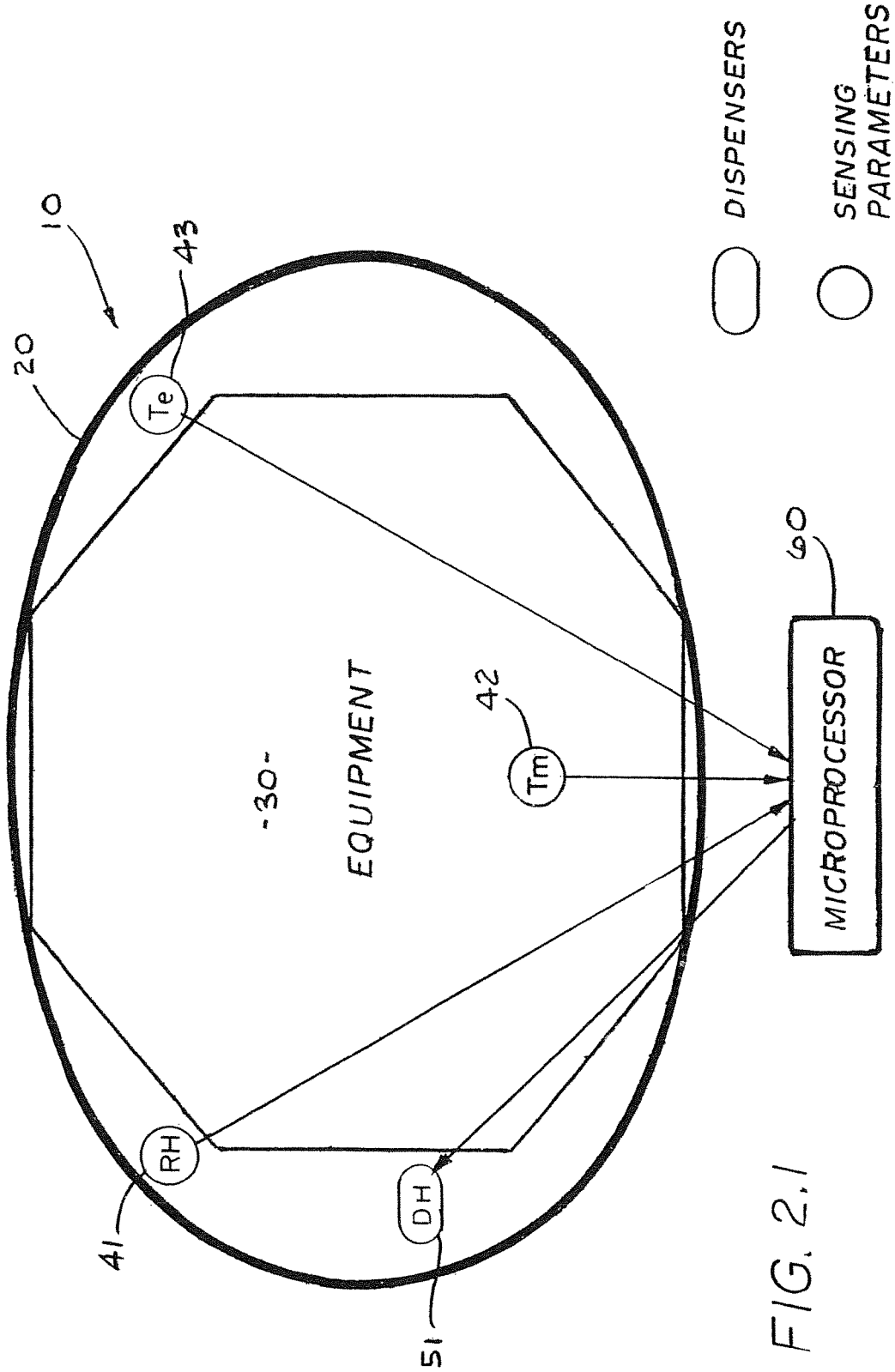
FIG. 2.1

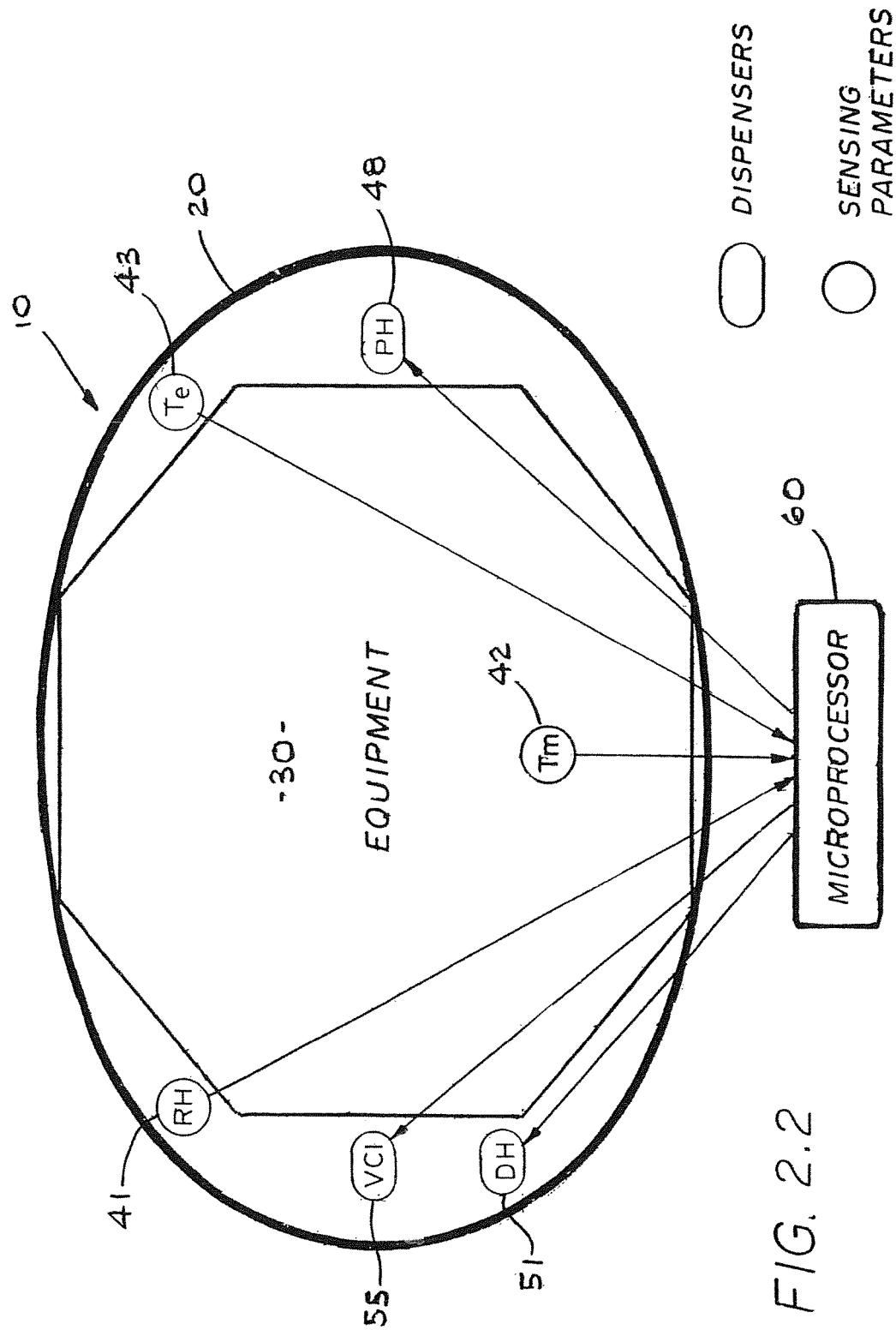
FIG. 2.2

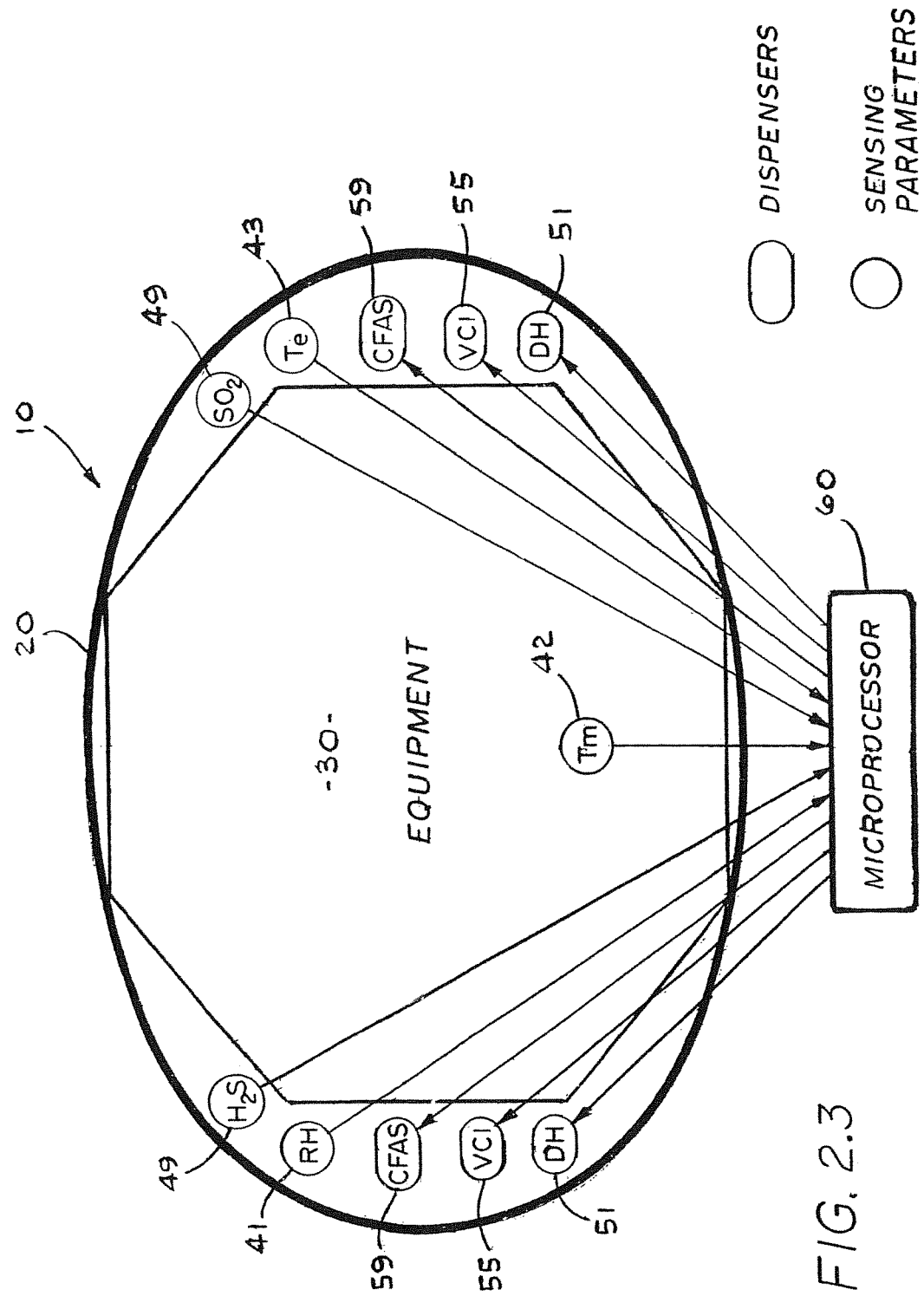
FIG. 2.3

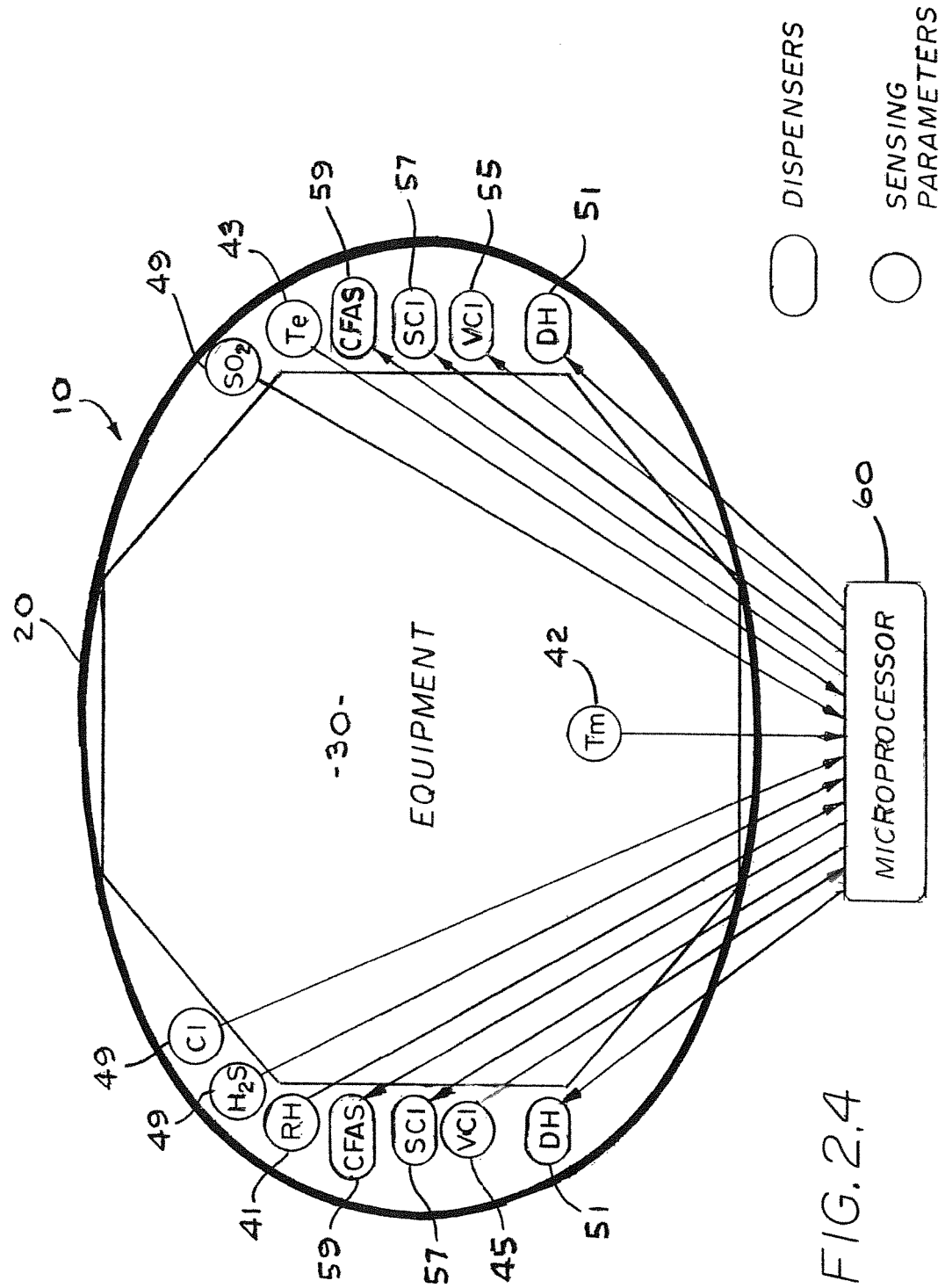
FIG. 2.4

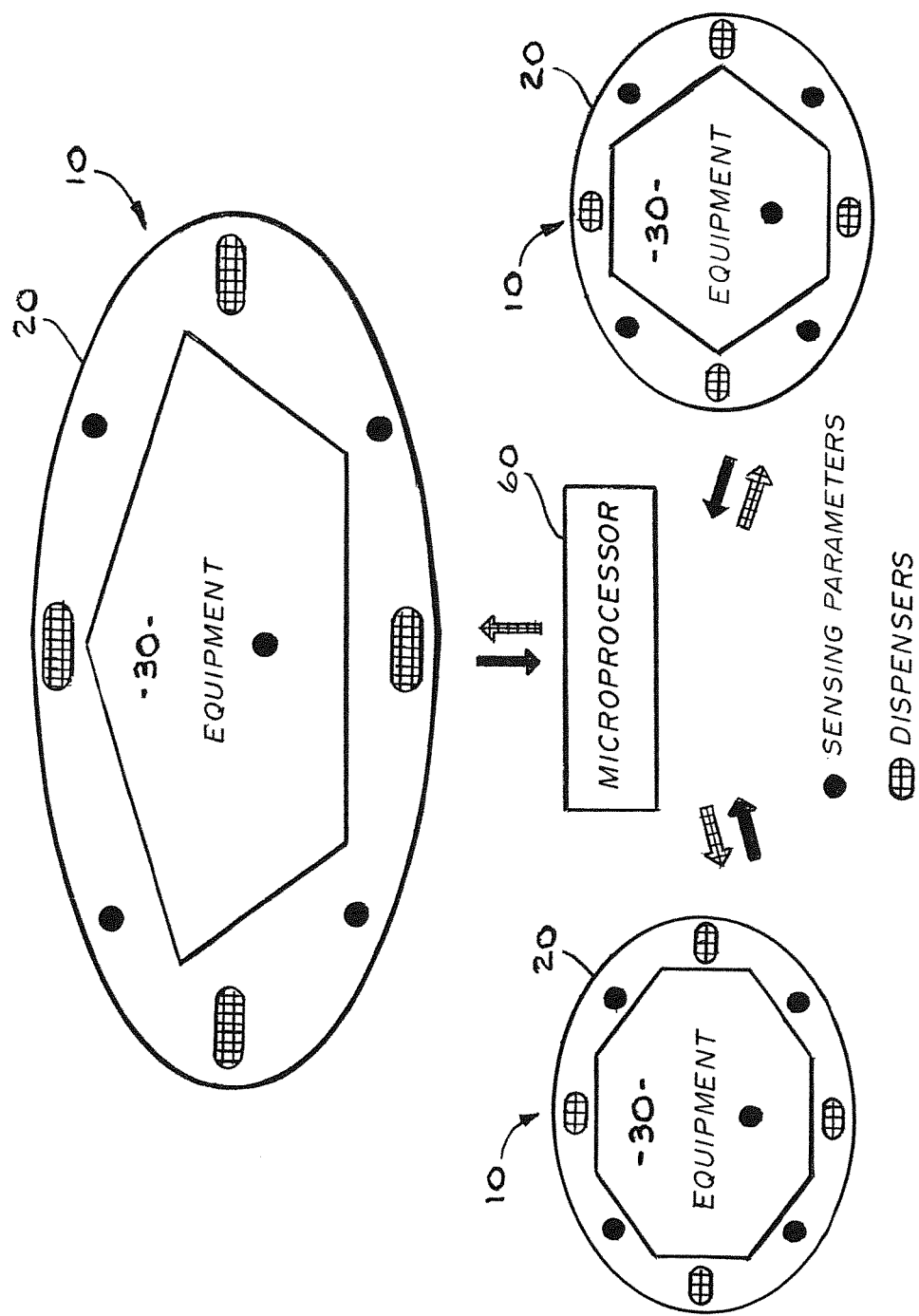
FIG. 3.1

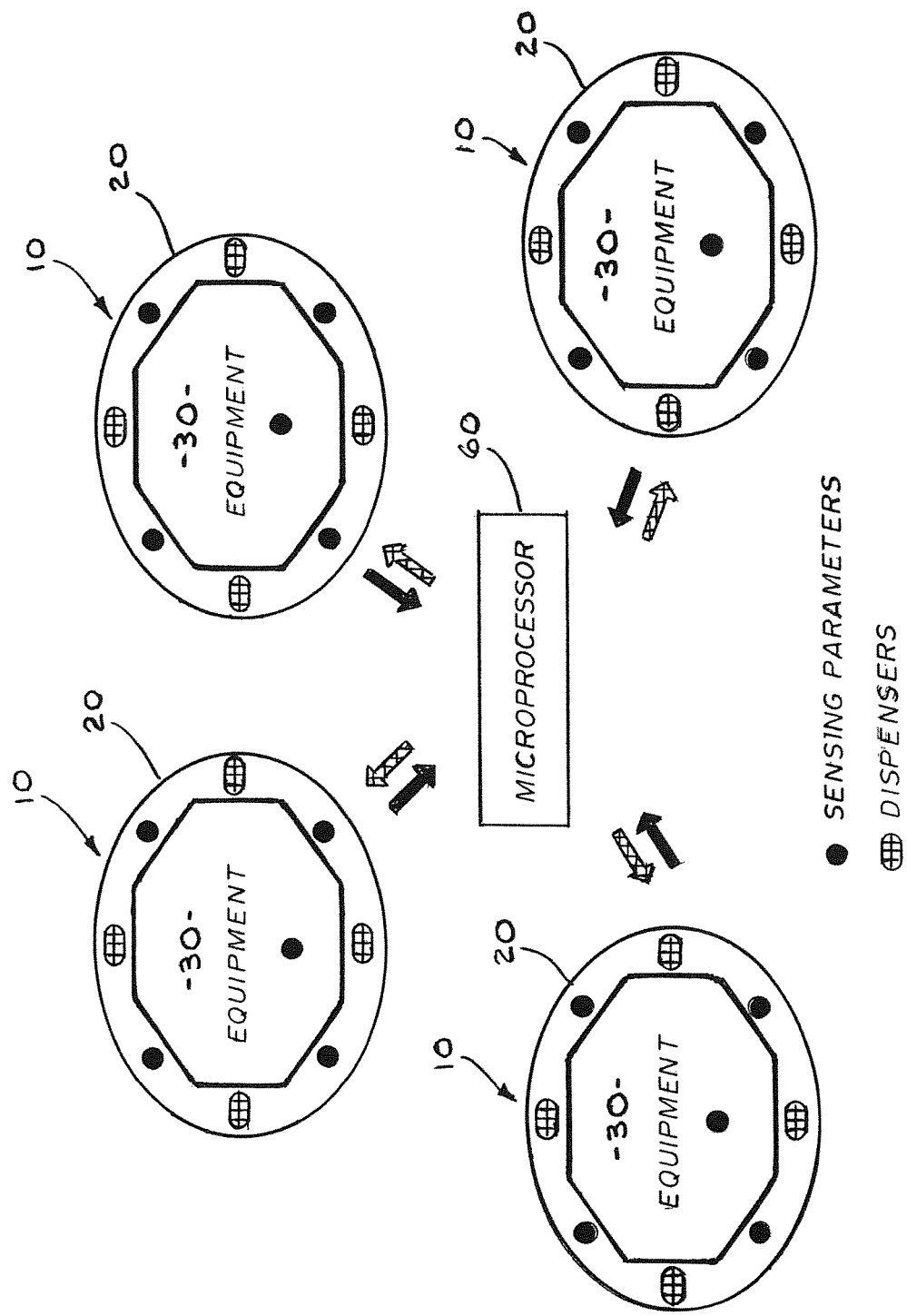
FIG. 3.2

SMART, ON-DEMAND CONTROLLED RELEASE CORROSION PROTECTION AND/OR PREVENTION OF METALS IN AN ENCLOSURE

FIELD OF THE INVENTION

The present invention relates to a smart enclosure protection system as for packages that contain metals. The metals are generally articles, for example equipment, machines, parts, electronic devices and the like. The packages and/or metals can generally be transient in nature or stationary items such as operational equipment. Protection is obtained by the enclosure having various sensors and dispensers therein such as volatile corrosion inhibitors (VCI) sensors, relative humidity (RH) sensors, metal temperature (Tm) sensors as well as environmental temperature (Te) sensors, corrosive fluid sensors and the like. Upon detection of an abnormal amount of an item such as excessively high relative humidity, e.g. moisture that can cause corrosion of the metal, a signal is sent to a microprocessor that responds by activating various one or more different dispensers that contain compounds such as dehumidifying (DH) compounds, e.g. desiccants, VCI compounds, soluble corrosion inhibitors (SCI) compounds, corrosive fluid absorbers and scavengers (CFAS), etc., that are dispensed into the enclosure environment to adequately protect the metal article. That is, the various dispensing compounds are dispensed, either independently or in combination thereof with one another. Moreover, the various dispensed compounds can be delivered at effective variable flow release rates and variable amounts to provide effective corrosion protection at all times. The smart enclosure protection system also readily adapts to changing environmental and climate conditions during the delivery life of the package or housing, and delivers such compounds on-demand for sufficient and extended lengths of time to protect the metal.

BACKGROUND OF INVENTION

Current corrosion protection systems utilize packaging materials made of polymeric-films with very low-to-zero water vapor transmission rates (WVTR), polymeric films which are impregnated with volatile corrosion inhibitors (VCI), paper packaging which are coated or impregnated with VCI, VCI capsules and emitters and also metallic, plastic, wooden, and cardboard boxes containing dehumidifiers such as desiccants.

Typically, corrosion protection is provided by VCI impregnated packaging polymeric films with various WVTR from very high (breathing film) to zero WVTR (barrier film), as well as absorbent media such as capsules and emitters. Depending on the packaging requirements, some packaging systems are subjected to nitrogen gas blanket to prevent oxidation and also vacuum to eliminate the availability of oxygen and humidity. These packaging systems are costly in terms of materials and processes due to manpower required and other technical steps required.

Often, existing packaging and other enclosure systems are not efficient because of the following reasons:

They provide only a constant amount of a fixed type of VCI in spite of continuously changing environmental and climate conditions as well as concentration of corrosion-causing chemicals/molecules in air.

Most of the articles have parts made of different metals, e.g., low carbon alloy, stainless steel, copper, aluminum, magnesium and different alloys based on these metals, galvanized (zinc, nickel, chromium, etc.) parts, etc., requiring different types of VCI to achieve corrosion protection.

Metallic equipment can contain fabrics/cloths/woods that can absorb water. The same can also create corrosion problems when the temperature increases and decreases due to evaporation and condensation.

Metal parts with different thicknesses have corrosion that occurs due to the dependency of the rate and level of water vapor condensation on thick metal as a function of rate of temperature change.

When the thickness of condensed vapor increases; the corrosion rate can increase due to the insufficient level of corrosion inhibitors.

In life, one of the well known facts is that environmental and weather conditions will continuously vary during any given journey, whether it is on land and/or overseas. Moreover, the weather conditions will always vary at different geographical locations and different times throughout the day and night during the journey. Global distribution of metallic materials require continuous protection with respect to varying and unpredictable environments, changing temperatures (T) and relative humidity (RH), and different corrosion causing gaseous molecules/chemicals in the enclosure environment. Various articles such as parts and equipment are subjected to corrosive environments for long durations at these varying corrosive conditions. Current technologies and products are not always effective for corrosion protection since they generally have a limited life with respect to corrosion protection and/or prevention systems that generally provide VCI only through VCI paper, VCI film, and/or other devices that use fixed amounts of any one type of VCI. Moreover, packaging of the article is prepared for the entire journey from the original point to the final destination using fixed types and amounts of VCI. The VCI formulation used is supposedly a universal type which does not take into consideration variable metals, environmental and climate conditions. Stationary metal articles such as those used on machines, equipment and the like also encounter similar problems as the weather conditions can change from dry to heavy rains, excessive humidity, night and day conditions, and the like. Such enclosures are often not sealed off with respect to the environment, thus promoting corrosion.

SUMMARY OF THE INVENTION

The enclosure systems of the present invention utilize smart and on-demand protection technologies and products to provide corrosion protection to dynamically varying environmental and climate conditions through one or more types of RH compounds, one or more types of VCI compounds, one or more different types of SCI compounds, various corrosive fluid absorbers or scavengers, or any combination thereof. The absorbers and scavenger compounds are effective in treating corrosive gasses such as Cl, $H_2S$, $SO_2$, various acids and various bases, etc. The on-demand, enclosure corrosion protection systems of the present invention immediately respond to adverse corrosion conditions through programmed process controllers (e.g. microprocessor) that detect adverse corrosion conditions through the above one or more noted sensors.

The smart, on-demand enclosure systems of the present invention can be utilized with respect to transient protection systems such as packages, diffusion devices, and the like as well as stationary systems such as metal articles in the operation of various equipment, machines and the like.

The smart, on-demand corrosion resistant enclosure systems have the following favorable aspects:

Provide self-initiating release of fast acting VCI, etc., as required depending on the storage locations and seasons, and environmental conditions such as $H_2S$, $SO_2$, Cl, etc., immediately after the enclosure is completed to avoid commencement of corrosion.

Provide slow acting/long-term release of different types of inhibitors that are designed specifically for the type and complicity of articles such as metal parts and equipment as a function of duration, location, and seasons.

Provide systems for long overseas transportation or short travel duration.

Provide, free of external input and outside monitoring, long (years) or short (months) storage at various geographic locations, stationary and/or transient, with varying relative humidity as well as corrosion-causing gaseous molecules/chemicals and temperature conditions.

Provide required concentrations of volatile corrosion inhibitors, soluble corrosion inhibitor(s), dehumidifying compounds and anti-corrosion fluids that as a function of the levels and compositions of corrosive vapors in air and absorbed by the surface of the articles to be protected as well as condensed on the article to be protected.

Provide smart self-contained systems to deliver a pre-designed type and concentrations of VCI, SCI, DH, and CFAS, to match the environmental and climate conditions experienced during the journey, i.e. temperature, and/or salt levels in the air and/or relative humidity, as well as sulfur dioxide, hydrogen sulfide, or chloride levels and other halogens in the air.

The smart on-demand packaging systems deliver effective types and amounts of the above-noted inhibitors as a function of the levels of RH, temperature, and corrosive compounds in the air of the package and on the surfaces of materials.

The corrosion protection system of the present invention comprises an enclosure having one or more sensors therein, a microprocessor that is operatively connected to said one or more sensors, one or more dispensers that is generally dispensing anti-corrosion compounds, and one or more dispensers operatively connected to said microprocessor. The one or more sensors are located within the disclosure while the microprocessor optionally can be located within (preferred) the disclosure or outside thereof. The one or more dispensers can also be located within (preferred) the disclosure are optionally outside thereof. These components form the corrosion protection enclosure system of the present invention that is a self-contained, self-initiating, self-controlled, smart, as well as an on-demand system. That is, no other outside item or items or articles are required and no external power source such as electricity is required. Since the system is self-contained, it has an electrical power source therein, such as batteries, and the like. In other words, the corrosion protection enclosure system of the present invention is free of any outside power source. A distinct advantage of the present invention is that it can provide corrosion protection to a metal, as contained in a package, within the enclosure for extended periods of time such as months or years since the microprocessor is formatted to maintain an anti-corrosive atmosphere through the release of one or more compounds from the one or more dispensers. If the corrosion protection system contains a microprocessor and/or one or more dispensers located outside of the enclosure, the same along with the enclosure can be located within a crate or convenient shipping, delivery, transportation and the like.

A corrosion protection enclosure system for maintaining an on-demand, long-term corrosion-free environment, comprises an enclosure capable of containing a metal article, said enclosure having at least one sensor, said sensor comprising at least one relative humidity sensor for sensing the relative humidity in said enclosure, at least one temperature sensor for sensing the temperature in said enclosure, at least one VCI sensor for sensing the amount of VCI vapor in said enclosure, or at least one CF sensor for sensing the amount of a corrosive fluid in said enclosure, or any combination thereof; said enclosure having at least one corrosion abating dispenser, said dispenser comprising at least one dehumidifier dispenser located either inside said enclosure or outside said enclosure and having at least one dehumidifying compound therein, at least one VCI dispenser located either inside said enclosure or outside said enclosure and having at least one VCI therein, or at least one SCI dispenser located either inside said enclosure or outside said enclosure and having at least one SCI therein, or at least one CFAS dispenser located either inside said enclosure or outside said enclosure and having at least one CFAS therein, or any combination thereof; a microprocessor, said microprocessor, independently, being operatively connected to said at least one relative humidity sensor, to said at least one temperature sensor, to said at least one VCI sensor, or to said at least one CF sensor, or any combination thereof; said microprocessor, independently, being operatively connected to said at least one dehumidifying compound dispenser, or said at least one VCI dispenser, or at least one SCI dispenser, or said at least one CFAS dispenser, or any combination thereof; and said microprocessor, independently, upon receiving a signal from any of said sensors that the amount of the detected item thereof is abnormal being capable of energizing said one or more corrosion abating dispensers and releasing said at least one corrosion abating dispensing compound into said enclosure.

A corrosion protection enclosure system for maintaining an on-demand, long-term corrosion-free environment, comprises an enclosure capable of containing a metal article; said enclosure having at least one relative humidity sensor for sensing the relative humidity in said enclosure; at least one corrosion abating dehumidifier dispenser having at least one dehumidifying compound therein, said dehumidifier dispenser being located inside said enclosure or outside said enclosure; a microprocessor, said microprocessor being operatively connected to said at least one relative humidity sensor, and being operatively connected to said at least one dehumidifier dispenser; and said microprocessor, upon receiving a signal from said relative humidity sensor that the relative humidity in said enclosure is above a specific value, being capable of energizing said dehumidifier dispenser and releasing at least one said dehumidifying compound into said enclosure.

A corrosion protection enclosure system for maintaining an on-demand, long-term corrosion-free environment comprises an enclosure capable of containing a metal article; said enclosure having at least one CF sensor for sensing the amount of a corrosive gas in said enclosure; at least one CFAS dispenser located either inside said enclosure or outside said enclosure and having at least one CFAS therein; and said microprocessor being operatively connected to said at least one CF sensor and said microprocessor being operatively connected to said at least one CFAS dispenser, said microprocessor upon receiving a signal from said CF sensor that the amount of said corrosive fluid in said enclosure is above a specific value, being capable of energizing said CFAS dispenser and releasing at least one CFAS compound into said enclosure.

A corrosion protection enclosure system for maintaining an on-demand, long-term corrosion-free environment comprises an enclosure capable of containing a metal article; said enclosure having at least one temperature sensor for sensing the temperature in said enclosure; or said enclosure having at least one VCI sensor for sensing the amount of VCI vapor in said enclosure; or both; at least one corrosion abating VCI dispenser located either inside said enclosure or outside said enclosure and having at least one VCI therein; and a microprocessor, said microprocessor being operatively connected to said at least one temperature sensor; or said microprocessor being operatively connected to said at least one VCI sensor, or both; said micro-processor being operatively connected to said at least one VCI dispenser; said microprocessor upon receiving a signal from said temperature sensor that said temperature is said enclosure is above a specific value, being capable of energizing said VCI dispenser and releasing said at least one VCI into said enclosure, or said microprocessor upon receiving a signal from said temperature sensor that the temperature in said enclosure is below a specific value, being capable of energizing said VCI dispenser and releasing said at least one VCI into said enclosure, or both.

A corrosion protection enclosure system for maintaining an on-demand, long-term corrosion-free environment, comprises said enclosure capable of containing a metal article; an enclosure having at least one temperature sensor for sensing the temperature in said enclosure; at least one corrosion abating dehumidifier dispenser having at least one dehumidifying compound therein, said dehumidifying dispenser being located inside said enclosure or outside said enclosure; and at least one corrosion inhibiting VCI dispenser located either inside said enclosure or outside said enclosure and having at least one VCI therein; a microprocessor, said micro-processor being operatively connected to said at least one temperature sensor; said microprocessor being operatively connected to said at least one dehumidifier dispenser sensor, and being operatively connected to said at least one VCI dispenser; said microprocessor, upon receiving a signal from said temperature sensor that the temperature in said enclosure is above a specific value, being capable of energizing said dehumidifier dispenser and releasing at least one dehumidifying compound into said enclosure; or said microprocessor, upon receiving a signal from said temperature sensor that said temperature in said enclosure is above a specific value, being capable of energizing said VCI dispenser and releasing at least one VCI into said enclosure; or both.

BRIEF DESCRIPTION OF THE DRAWINGS

In the drawings, the following Table sets forth the descriptions of the various acronyms with respect to the sensors (within the circle) and dispensers (within the rectangle).

| SENSORS | DISPENSERS |
| --- | --- |
| RH—Relative Humidity | DH—Dehumidifying Compounds |
| Tm—Temperature of Metal | VCI—Volatile Corrosion Inhibitor Compounds |
| Te—Temperature of Exterior Area | |
| VCI—Volatile Corrosion Inhibitor | SCI—Soluble Corrosion Inhibitor Compounds |
| CF—Corrosive Fluids | |
| $H_2O$—Water | CFAS—Corrosion Fluid Absorbers and Scavenger Compounds |
| $H_2S$—Hydrogen Sulfide | |
| $SO_2$—Sulfur Dioxide | |

-continued

| SENSORS | DISPENSERS |
| --- | --- |
| Cl—Chlorine | |
| pH | |

FIG. 1.1 relates to an enclosure system for corrosion protection in warehouses with a controlled environment.

FIG. 1.2 relates to an enclosure system for corrosion protection in a rural environment.

FIG. 1.3 relates to an enclosure system for corrosion protection in an industrial environment, e.g. refineries, chemical and mining.

FIG. 1.4 relates to an enclosure system for corrosion protection in a sea and ocean environment, e.g. offshore platforms, and docks, FIG. 1.5 relates to an enclosure system for corrosion protection in a most aggressive environment, e.g., refineries, mining, chemical industries located at an ocean, etc.

FIG. 2.1 relates to a different embodiment for an enclosure system for corrosion protection in warehouses with a controlled environment.

FIG. 2.2 relates to a different embodiment for an enclosure system for corrosion protection in a rural environment.

FIG. 2.3 relates to a different embodiment for an enclosure system for corrosion protection in an industrial environment, e.g. refineries, chemical and mining.

FIG. 2.4 relates to a different embodiment for an enclosure system for corrosion protection in a most aggressive environment, e.g. refineries, mining, chemical industries located at an ocean, etc.

FIG. 3.1 relates to a multi-channel enclosure system for monitoring corrosion protection in different packagings.

FIG. 3.2 relates to a different embodiment of a multi-channel enclosure system for monitoring corrosion protection in different packagings.

Figure 4:
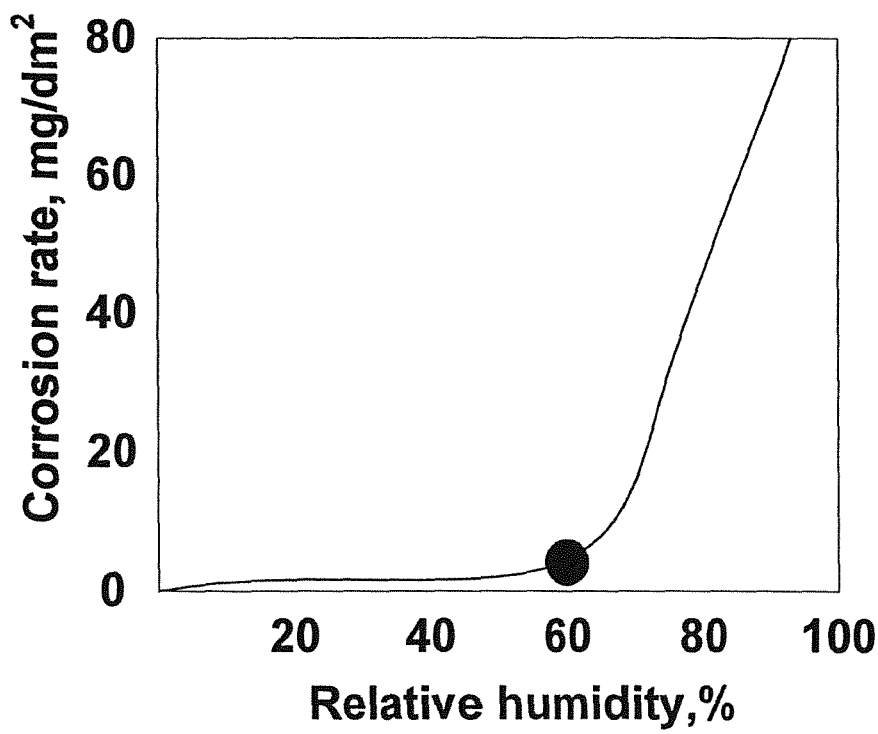

FIG. 4 relates to a chart comparing the corrosion rate of carbon steel with respect to relative humidity of the environment.

Figure 5:
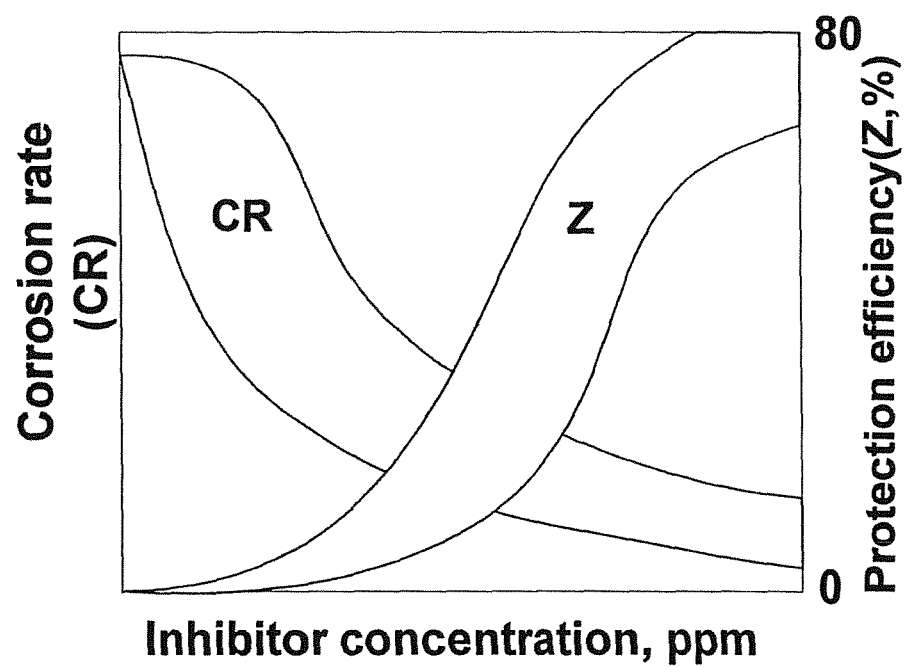

FIG. 5 relates to a chart comparing the corrosion rate with respect to inhibitor concentration that yield the protection efficiency with respect to carbon steel.

Figure 6:
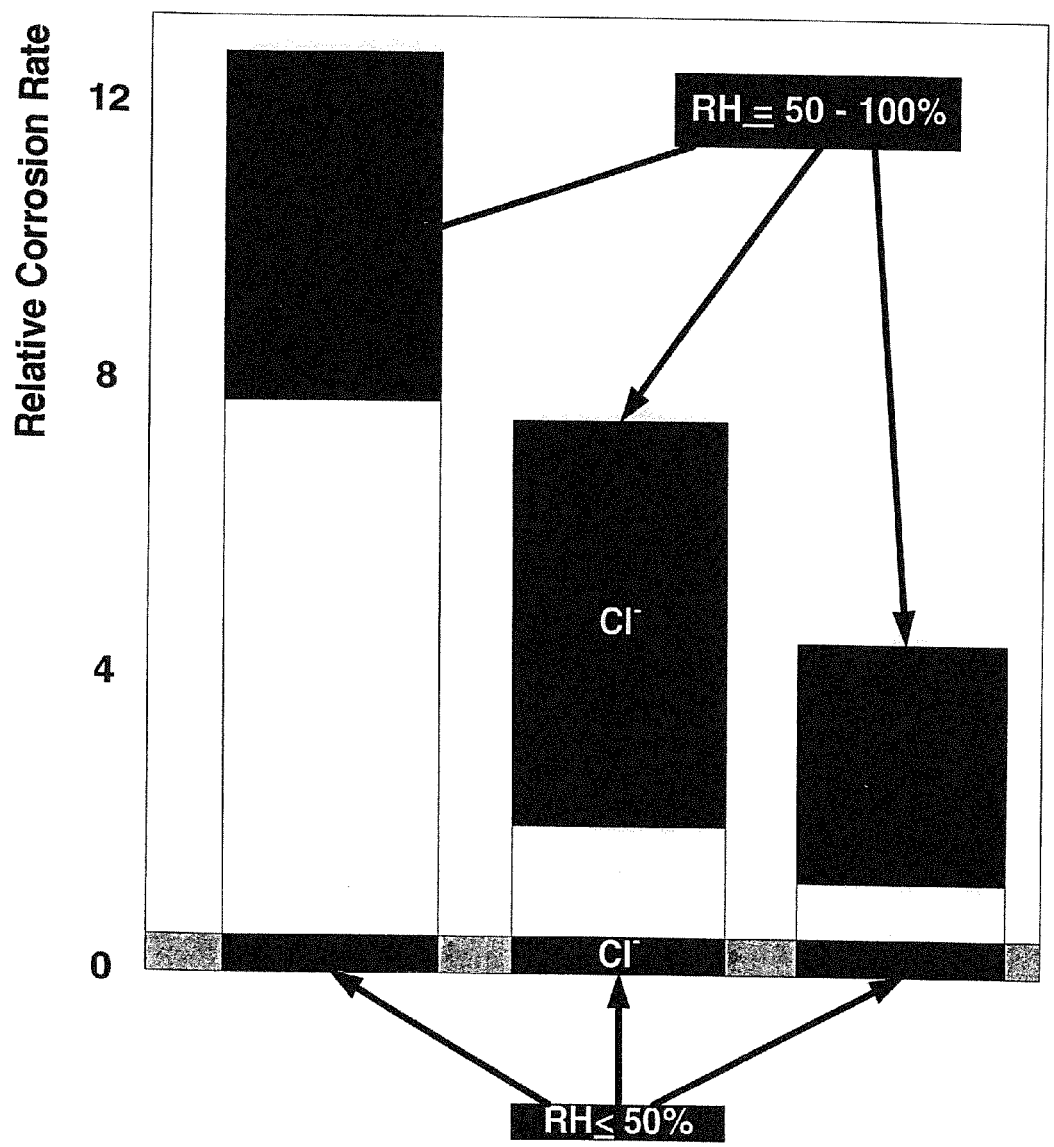

FIG. 6 relates to a comparison of relative humidity levels with respect to corrosive gases of $H_2O$, $SO_2$, and Cl with respect to metals, e.g. carbon steel.

Figure 7:
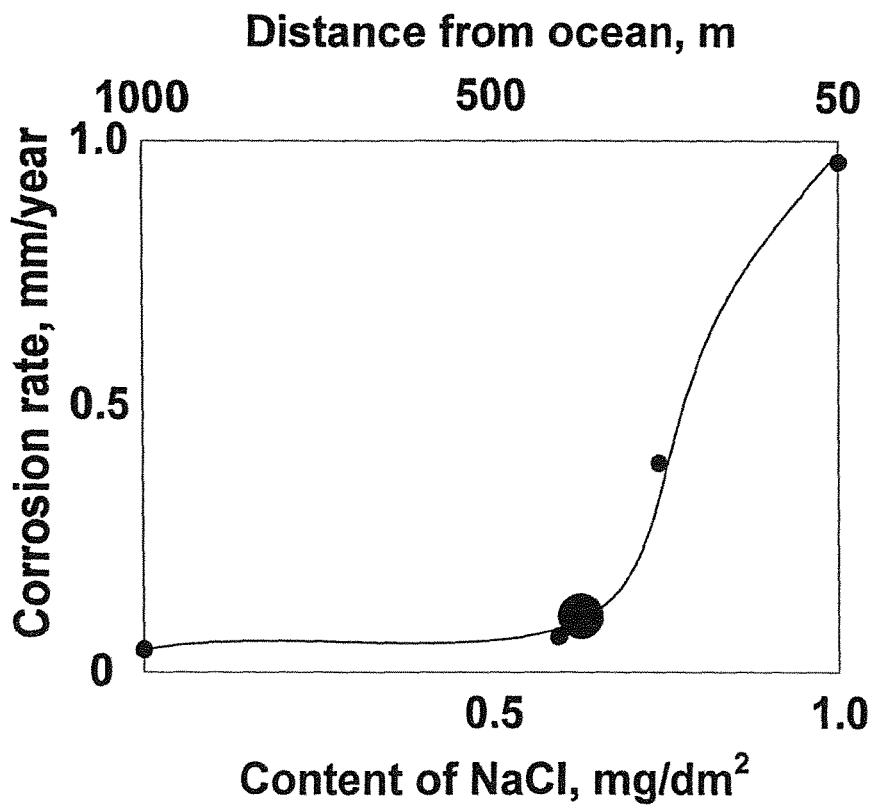

FIG. 7 relates to the corrosion rate of carbon steel with regard to sodium chloride salt with respect to the metal distance from an ocean.

Figure 8:
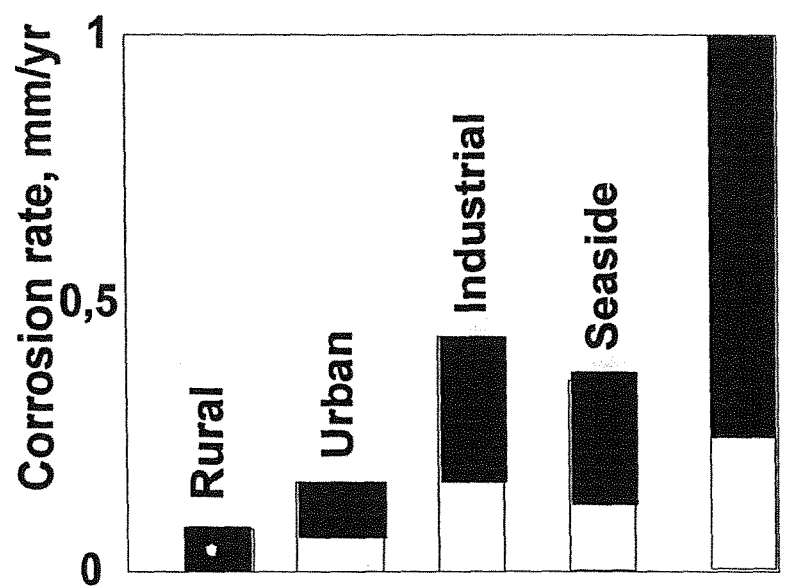

FIG. 8 relates to an enclosure in common corrosive environments, such as rural, urban, industrial, seaside, and marine with respect to metals, e.g. carbon steel.

Figure 9:
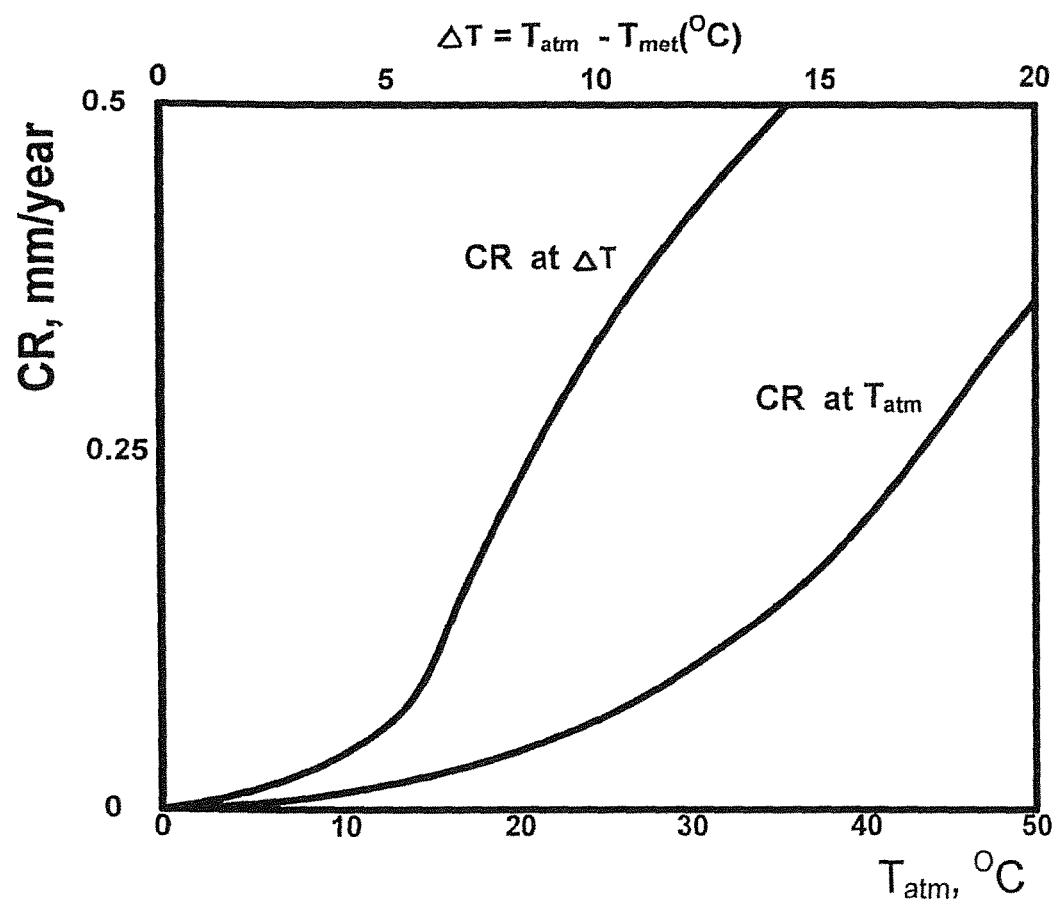

FIG. 9 relates to a comparison of the corrosion rate when the temperature of the metal part (steel for example) less that the temperature of environment (atmosphere for example) since condensation takes place.

DETAILED DESCRIPTION OF THE INVENTION

The smart, on-demand enclosure corrosion protection system of the present invention will be discussed with regard to a packaging system. However, it is also applicable, as noted above, to other transient systems such as diffusion systems or devices, as well as to stationary systems that contain a metal article, such as equipment, machines, and the like and are enclosed as within a housing. That is, the principles of the present invention can be readily used or applied to such additional enclosures to obtain good corrosion protection with regard to metal articles. Examples of such items include various automotive parts or parts for trucks, buses, trains and planes, various tools, various electronic equipment including microprocessors and parts thereof, electrical parts as for electrical motors or equipment, various types of phones including cell phones, smart phones, I-phones, various manufacturing plant equipment, as well as different enclosures for storage or storage tanks, transportation, various types of equipment, heat exchangers, cooling towers, boilers, mothballed equipment, etc.

A packaging system of the present invention generally comprises an enclosure 10 that contains enclosure package 20 that contains a metal article 30 that is protected from corrosion. Enclosure 10 also contains a variety of sensors 40 that are desirably not located within the package but within the enclosure. Typical types of sensors include one or more relative humidity (RH) detection sensors 41, one or more temperature detection sensors, i.e. temperature of the metal sensor 42 and temperature of the enclosure environment sensor 43 such as various Campbell Scientific sensors, one or more volatile corrosion inhibitors VCI vapor detection sensors 45, one or more soluble corrosion inhibitor (SCI) detection sensors 47, as well as one or more corrosion fluid detection sensors 49. Of course, various combinations of all the above sensor types can be utilized as is more fully described herein below. Such fluid corrosion sensors are known to the art and to the literature and are made by Honeywell, e.g. $H_2S$, $SO_2$, and RH sensors, and Orion, e.g. chloride sensors. Such sensors are programmed, formatted, etc., to detect abnormal conditions within enclosure 10 that are corrosive with respect to metal 30.

The present invention generally contains at least one RH sensor and at least one temperature sensor Te 43 that detects the temperature of the atmosphere within enclosure 10 and of at least one temperature sensor Tm 42 detects the temperature of metal article 30 located within enclosure 10. The actual use of the various different sensors in a particular corrosion protection package can vary with regard to different environmental conditions, but generally the use of RH sensors 41 and temperature Tm sensors 42 and Te sensors 43 are preferred since they readily detect the amount of water and/or water vapor within the package, that tends to vary proportionally with increasing temperature, that is a strong indication of corrosion conditions. Also, if the Tm sensor is below the Te sensor, the same is also a strong indication that water will condense out on the metal and subsequently cause corrosion. The use of a corrosion gas (CG) sensor 49 is often important. The VCI sensor 45 and SCI sensor 47 are utilized, of course, to detect whether adequate amounts of such inhibitors are contained within enclosure 10.

While the above noted one or more various sensors must be located within enclosure 10 to determine the various conditions therein, independently and optionally, additional one or more of each type of sensor may be located outside of the enclosure, not shown, and the same is not preferred.

The present invention utilizes different types of dispensers that contain one or more different types of compounds therein. Examples of dispensers include one or more DH dispensers 51, as well as one or more VCI dispensers 55 and/or one or more SCI dispensers 57, and/or one or more corrosive fluid scavenger and absorber (CFAS) sensors 59. Various combinations of the same can be utilized. The various types of dispensers can be located within enclosure 10 as generally shown in FIGS. 1.1 through 1.5, FIGS. 2-1 through 2.4, and FIGS. 3.1 and FIG. 3.2. Independently and optionally, one or more of each type of dispensers can be located outside the enclosure and they can be connected thereto generally in any manner known to the art and to the literature, such as via pipes, conduits, tubes, hoses, and the like, so that the compounds therein can be transported into the enclosure. Preferably, the various types of dispensers are located within enclosure 10 as shown.

The smart, on-demand corrosion protection enclosure system 10 of the present invention contains a pre-programmed process controller, generally referred to as a computer or a microprocessor 60, see FIGS. 1.1 through 1.5, FIGS. 2.1 through 2.4 and FIGS. 3.1 and 3.2. For sake of convenience, microprocessor 60 is preferably located within package enclosure 10, not shown, so that upon installation of the package 20 in an environment such as a truck, auto, ship, plane, train, building, room, or an open environment such as the Earth's atmosphere, the enclosure can be readily installed without the need to assemble exterior components thereto. Alternatively, microprocessor 60 can be located outside of the package, see FIGS. 1.1 through 1.5, FIGS. 2.1 through 2.4 and FIGS. 3.1 and 3.2.

Whether the microprocessor is located inside enclosure 10 or outside thereof, care must be taken that it is operatively connected to the various sensors located within package 20 and also to the various dispensers that are independently located within and/or outside the enclosure. Thus, many different permutations of operative connections exist. The operative connection of microprocessor 60 to the various sensors and various dispensers can be by wire or wireless. Wire connections are preferred since they do not require additional electronic equipment, such as transmitters, receivers, etc.

The metal articles such as various parts, equipment, tools, electronic devices, and the like, to be protected by the present invention generally relate to any metal or alloy known to the art and literature and representative examples include iron, steel, copper, zinc, aluminum, nickel, tin, chromium, magnesium, bronze, silver, and the like, and alloys thereof.

Enclosure 10 can generally be made out of various types of materials that are natural or synthetic and be in the form of woven fibers or sheets. Examples of natural materials include cotton, wool, or the like. Preferably, the enclosure is made out of various water resistant polymers such as various polyolefins, e.g., polyethylene or polypropylene, various polyesters such as poly(ethylene terephthate), polystyrene, poly(vinyl chloride), and the like.

The one or more dehumidifier dispensers 51 contain one or more various desiccants therein. Examples of suitable desiccants or dehumidifying compounds include activated alumina, aerogel, various clays such as bentonite clay, benzophenone, calcium chloride, lithium bromide, lithium chloride, magnesium perchlorate, molecular sieve or silica gels, or any combination thereof.

The amount of the relative humidity desiccants will vary with respect to the temperature and relative humidity within package 20. The amount of the one or more desiccants generally is an amount to keep the relative humidity within enclosure 10 and package 20 with a normal range of generally less than about 70%, generally less than about 60%, desirably less than about 50% and preferably less than about 40%. Thus, the size of relative humidity dispenser 51 will vary accordingly.

The one or more VCI dispensers 55 naturally contain one or more volatile corrosion inhibitors therein that are known to the art and to the literature and generally include various triazoles and derivatives thereof such as benzotriazole and tolytriazole; various benzoates and derivatives thereof such as ammonium benzoate and cyclohexylammonium benzoate; various salts of benzoic acid; various carbamates; various alkali metal molybdates such as sodium molybdate; various dimolybdates such as ammonium dimolybdate; various amine molybdates such as aliphatic and/or aromatic amine having a total of from about 3 to about 30 carbon atoms or a salt thereof; various alkali dibasic acid salts and other compounds as set forth in U.S. Pat. Nos. 4,973,448; 5,139,700; 5,715,945; 6,028,160; 6,156,929; 6,617,415; and 6,787,065, hereby fully incorporated by reference, as well as various organic nitrites such as dicyclohexylammonium nitrite and triethanolammonium nitrite, or alkali metal nitrites, or any combination thereof. Preferred VCIs include potassium nitrite and sodium nitrite, amine salts, benzoates, nitrobenzoates, phosphates, carbonates such as potassium carbonate, imidazolines, hexylamine, naphthalene, ammonia, benzotriazole, benzoimidazole, molybdates, and combinations thereof.

The amount of and concentration of the one or more VCI inhibitors depends upon environmental conditions, temperature, relative humidity, and the like expected to be encountered. Thus, the size of the VCI dispenser will vary accordingly.

Generally the amount of the one or more VCI inhibitors in enclosure 10 or package 20, when utilized, is from about 20 to about 500, or about 1,000, or about 10,000, or about 100,000 ppm (0.02 to 0.5%) desirably from about 30 to about 350 ppm, and preferably from about 50 to about 200 ppm of air or enclosed atmosphere.

The one or more SCI dispensers naturally contain suitable SCI compounds which are dissolvable in water that include, but are not limited to, one or more of organic nitrites, borates, organic aminophosphites, phosphates, polyphosphates, silicates, potassium hydroxide, sodium hydroxide, various amine base compounds, sulphonates, zinc sulfate, or calcium bicarbonate, or any combinations thereof. Generally, or desirably, the various SCI compounds are dissolved in solvent so that they are in liquid form. Suitable solvents include, but are not limited to, water, aqueous solutions of sodium, potassium, and calcium compounds, or mixtures of two or more thereof. Suitable sodium and calcium compounds for use in forming the above-mentioned aqueous solvents include, but are not limited to, $Na_2MoO_4$, $NaSO_4$, $Na_3PO_4$, $NaH_2PO_4$, $NaNO_2$, $Na_2SiO_3$, calcium phosphonate, or combinations thereof. The amount of the one or more SCI compounds will naturally vary depending upon the expected environmental conditions, temperature, relative humidity and the like that is expected to be encountered. Hence, the size of the SCI dispenser will vary accordingly. Desirably the amount of the one or more SCI compounds per se, when utilized, in enclosure 10 or package 20, will range from about 20 to about 500, or about 1,000, or about 10,000, or about 100,000 ppm, desirably from about 30 to about 350 ppm, and preferably from about 50 to about 200 ppm of liquid condensate (e.g. water) in the enclosure or package.

In another embodiment, the one or more soluble corrosion inhibitors of the present invention can be nano-sized powdered corrosion inhibitors containing substantially spherical-shaped particles having an average diameter of less than about 2500 nanometers, less than about 1000 nanometers, less than about 500 nanometers, or even less than about 250 nanometers. However, any nano-sized powder can be utilized including other particle geometries.

Corrosive fluids that are often encountered in the protection of metals often include sulfur dioxide ($SO_2$), hydrogen sulfide ($H_2S$), halogen gases such as chlorine or chloride ions or bromine or bromide ions, HCl vapors, and the like. Other corrosive gases or fluids containing the same, include $O_2$, $CO_2$, $NO_2$, and the like. Still other corrosive fluids include various sulfur gases, various acids such as $H_2SO_4$, $H_2SO_3$, $H_2CO_3$, various bases such as hydrogen peroxide, methanol, ozone, phenol, phosphine, and the like. These corrosive fluids are collectively detected by generic corrosion fluid sensor (CF) 49.

Various compounds for treating the above-noted corrosive fluids include various corrosive fluid absorbers, generally solids, and/or scavengers, generally volatile compounds, (CFAS) that are contained in CFAS dispenser 59. Examples of suitable absorbers and scavengers are known to the art and to the literature and include hydroxyl radicals such as various hydroperoxides, i.e. ROOH where R is an aliphatic containing from 1 to 5, 10, or 15 carbon atoms, generally with respect to such as $CO_2$, $H_2S$, $SO_2$, and the like. Also compounds that can function as scavengers generally include triethylene glycol, various amines, pyridine, imidazoline, water, sodium hydroxide, methylamineethanol, monoethanolamine, methyldiethanol amine, Criegee Intermediate ($CH_2OO$), and the like. Hydrazine, ascorbic acid, aminoquanidine compounds, and water can be utilized with respect to absorbing or scavenging $O_2$. Organotin compounds, sodium hydroxide, and water can be utilized for absorbing or scavenging chlorine as well as bromine compounds. Water can be absorbed or scavenged by various polyurethane based compounds, iminoalcohols, oxazolidine compounds, triethylene glycol, and zinc oxide. The amount of the generally one or more volatile scavenger compounds generally is from about 20 to about 500, or about 1,000, or about 10,000, or about 100,000 ppm (0.02 to 0.5%) desirably from about 30 to about 350 ppm, and preferably from about 50 to about 200 ppm of air or enclosed atmosphere. The amount of the one or more absorbers is generally a sufficient or effective amount to reduce or abate the corrosive compound to a predetermined, or corrosion safe level.

Still another sensor that can be utilized by the corrosion resistant enclosure system of the present invention is a pH meter. The pH sensor 48, naturally determined whether the atmosphere within package 20 is acidic, caustic, or neutral. If acidic, dispensing compounds can be utilized such as amines, hydroxides, carbonates, basic inhibitors and the like to increase the pH to about 7 or greater.

The amounts of the one or more DH compounds, the one or more VCI compounds and the one or more SCI compounds, will also vary with respect to the types of metal such as Fe, Cu, Al, Zn, etc., to be protected from corrosion, the frequency of potential condensation in package 20 such as condensation at night, etc., and the thickness of any condensed layer. However, the smart, on-demand system of the present invention allow these additional factors to be factored, formatted, programmed, etc., into microprocessor 60 to obtain optimum levels of the noted VCI, SCI and DH, e.g. (desiccants), used for protection.

With regard to enclosure systems for stationary applications such as machines, instruments, and the like, the same can be protected utilizing the above-noted principles of the present invention. That is, they are enclosed by a suitable material such as a fabric enclosure of synthetic or natural fibers, for example a polyester, polyethylene, nylon, cotton, etc. The machine or equipment is then protected in the same manner utilizing one or more of the above-noted sensors within the stationary enclosure containing one or more of the above-noted dispensers within the enclosure, or outside and connected thereto, that are controlled through the use of a microprocessor that maintains low or non-existent conditions of various corrosives.

An important advantage of the present invention is that the smart, on-demand, enclosure system of the present invention gives short term protection of from at least about 1, about 2, about 3, or about 4 months as well as long term protection of at least 6 months, about 9 months, about 1 year, about 2 years, or at least about 3 years. Such extended protection is obtained through the combination of the one or more sensors that monitor the amount of the above noted corrosion compounds, e.g. water or various corrosive gases, and the microprocessor that monitors the various sensors and responds thereto by dispensing sufficient and effective amounts of the above noted corrosion inhibitors to prevent corrosion occurrence. Since the enclosure system is designed to contain a sufficient amount of the various corrosion inhibitors, i.e., DH, VCIs, SCIs, and CFAS, the enclosure system can readily achieve such long term periods of time.

Due to the extended nature of protection of the present corrosion inhibiting enclosure system, an important disadvantage of the prior systems is readily overcome. That is, in the real world, leakage is a serious problem and occurs in most prior art systems due to imperfect seals, joints, connections, and the like that compromises the effectiveness of the enclosure systems.

While not preferred, the present invention can be manually operated or semi-manually operated. That is, in lieu of a computer analyzing the level of various items measured by the various sensors, the same can be read by a person who then can supply one or more inhibitors manually as through the operation of opening a proportional valve to admit a predetermined amount. Alternatively, when an amount is being added, the corresponding sensor is continuously read as to whether a reasonable low or safe level has been achieved and then the valve is closed.

Semi-automatic operations can also relate to various sensors issuing a warning as through an alarm, a bell, or other audible sound or visually as through a flashing light to indicate that the enclosure contains an unacceptable level of an item such as low amount of VCI compound, an excessive high amount of the relative humidity within the enclosure, or the detection of a corrosion compound such as $SO_2$, etc. Upon sounding of the alarm, an operator can then manually admit a necessary amount of an inhibitor, such as DH, SCI, VCI, CFAS, etc., to restore the enclosure environment to an acceptable level.

Through the use of microprocessor 60, the present invention is very versatile with regard to programming the amounts of compounds discharged from the various different dispensers. That is, microprocessor 60 can be programmed to release different amounts of the one or more different compounds from the one or more different dispensers depending upon various parameters such as non-metal volume of the enclosure, the surface area size of the metal article within the enclosure, the expected internal conditions with respect to the location of the enclosure such as the transient route thereof or the stationary location thereof, the external anticipated temperature of the environment, the external and expected relative humidity, or precipitation of the expected transient route or stationary location, and the like. Thus, the amount of the one or more dispensed compounds, such as the dehumidifying compound can be readily programmed to meet a variety of different conditions.

Considering the various sensors, relative humidity sensor 41 monitors the amount of relative humidity located within enclosure 10 and serves to protect metal article 30 from corrosion. With the passage of time, some of the relative humidity in the enclosure may be emitted therefrom, e.g. leakage, or in high humidity environments such as tropical regions, humidity may penetrate enclosure 10 and result in high humidity within the enclosure. If the enclosure has low humidity amounts, the same is not a problem. Upon sensing a programmed, predetermined high amount of relative humidity within enclosure 10, for example at least about 40%, or at least about 50%, or at least about 60%, a signal from RH sensor 41 will be sent to microprocessor 60. Microprocessor 60 is pre-programmed so that during the duration of protecting metal article 30 from corrosion, it will respond by emitting a predetermined or programmed amount of one or more abating dehumidifying compounds, e.g. desiccants from relative humidity dispenser 51 to return the levels of humidity within enclosure 10 to suitable ranges set forth above.

The predetermined amount of one or more desiccants is released through a proportional valve (not shown) located on DH dispenser 51. Once the effective amount of DH agent has been emitted to enclosure 10, the valve is automatically closed and remains closed until the next desired discharge of DH compounds.

Microprocessor 60, as noted above, can be programmed to release different amounts of abating dehumidifying compounds from dispenser 51 depending upon various parameters such as the size of the metal article, the surface area thereof, the non-metal article volume of enclosure 10, the relative humidity therein, as well as expected external conditions such as temperature, relative humidity, concentration of gaseous compounds, and the like. Also, the amount of dehumidifying compounds contained within a dispenser 51 can be varied depending upon such noted parameters as well as the expected duration or time of the use of package 20 before it is opened and the metal article removed therefrom.

With respect to the temperature sensors, the same generally correlate to the amount of humidity within enclosure 10. That is, if the temperature is high, the amount of humidity is generally great. The temperature within enclosure 10 is measured by sensor Te, whereas the temperature of the metal is measured by sensor Tm. If Tm is lower than Te, condensation can occur. Computer 60 can be programmed to release a sufficient or effective amount of one or more abating dehumidifying compounds (preferred), one or more abating VCI compounds, or one or more abating SCI compounds, or any combination thereof. Temperature sensor Tm can be used alone, or in conjunction with the RH sensor. When utilized alone, microprocessor 60 can be pre-preprogrammed. For example, in an environment wherein the amount of precipitation is generally about 30 or about 50 inches per year and the relative humidity is generally about 50% or 60%, upon reaching a programmed, pre-determined temperature such as about 80° F. or about 90° F. or greater, microprocessor 60 will send a signal to the various dispensers to alleviate the potential of moisture buildup within enclosure 30. This is achieved as by adding additional VCI compounds, additional SCI compounds, additional dehumidifying (DH) compounds such as various desiccants, or various corrosive fluid absorbers and scavengers (CFAS), or any combination thereof, with dehumidifying compounds being preferred. Desirably, temperature sensor Tm is utilized in conjunction with RH sensor 41. That is, if the combination of the temperature and relative humidity within enclosure 10 is above a certain value, the microprocessor can be programmed so that it will send a signal to RH dispenser 51 to release the humidifying compounds such as one or more desiccants to reduce the humidity to a desired, predetermined level. One or more different types of desiccants can be released depending upon the environment enclosure 10 is expected to transit through, or an expectant environment wherein enclosure 10 is stationary such as a machine or equipment. Once again, the predetermined amount of the moisture-reducing compound, desirably a dehumidifying compound is controlled through a proportional valve, not shown, located on the DH dispenser 51. Once a predetermined amount has been released to enclosure 10, the valve is automatically closed and remains closed until a signal is received from microprocessor 60 for the next desired discharge.

The VCI sensor 45 monitors the amount of VCI located within enclosure 10 and serves to protect metal article 30 from corrosion. With the passage of time, the amount of VCI may be less than adequate as a result of potential leakage to outside the enclosure 10 and/or utilization of the VCI to protect the metal article. Upon sensing a programmed, predetermined inadequate or low amount of VCI vapor within enclosure 10, a signal will be sent from VCI sensor 45 to microprocessor 60. Microprocessor 60 is pre-programmed so that during the duration of protecting metal article 30 from corrosion, it will respond by emitting a predetermined or programmed amount of one or more volatile corrosion inhibiting compounds from VCI dispenser 55 to return the levels of VCI concentrations within enclosure 10, to suitable ranges as set forth above. Microprocessor 60, as noted, can be programmed, upon detecting a predetermined low level of VCI, to release different amounts of VCI compounds from dispenser 55 depending upon various parameters known to the art such as the size of the metal article, the surface area thereof, the non-metal article volume of enclosure 10, expected external conditions such as temperature, relative humidity, optionally, the concentration of $SO_2$, $H_2S$, $Cl^-$ and the like. Also, the amount of VCI contained within a dispenser 55 can be determined depending upon the above noted parameters as well as the expected duration or time of the use of package 10 before it is opened and the metal article removed therefrom.

Alternatively, VCI sensors can be used in combination with relative humidity sensor 41, or temperature sensors 42 and 43, or all of them. That is, microprocessor 60 can be pre-programmed to respond to a combination of a VCI amount within enclosure 10 and the relative humidity thereof, or a combination of VCI amount within enclosure 10 and the temperature thereof, such as the metal 42 or environment 43, or of all of the above sensors to release a sufficient amount of VCI compound from VCI dispenser 55 to return the environment within enclosure 10 to a safe corrosion-free level.

The predetermined amount of VCI is released through a proportional valve located on VCI dispenser 55. Once the amount of VCI has been emitted to enclosure 10, the valve is automatically closed and remains closed until the next desired discharge of VCI compounds.

With respect to SCI dispenser 47, when RH sensor 41 and/or the temperature sensors reach programmed, predetermined levels such that condensation can or does occur within enclosure 10, a signal will be sent from sensors 41, 42 or 43, or any combination thereof to microprocessor 60. Microprocessor 60 is preprogrammed so that during the duration of protecting metal article 30 from corrosion, it will respond by emitting a predetermined or programmed amount of one or more SCIs from SCI dispenser 57 to achieve suitable ranges of SCI in enclosure 10 set forth above. For example, microprocessor 60 can be preprogrammed so that during the protection of metal article 30 from corrosion and upon sensing a high amount of relative humidity and/or a low metal temperature, it will respond by dispensing a predetermined amount of SCI to enclosure 10 so that metal article 30 is sufficiently protected from corrosion.

The predetermined amount of SCI is released through proportional valve located on SCI dispenser 47 into enclosure 10. Once the amount of SCI has been emitted to enclosure 10, the valve is automatically closed and remains closed until the next desired discharge of SCI compounds.

Microprocessor 60, as explained above, can be programmed to release different amounts of SCI compounds from dispenser 57 depending upon parameters such as the size of the metal article, the surface area thereof, the non-metal article, volume of enclosure 10, expected external conditions such as temperature, relative humidity, and the like. Also, the amount of SCI contained within a dispenser 57 can be varied depending upon such noted parameters as well as the expected duration or time of the use of package 20 before it is opened and the metal article removed therefrom.

Corrosion fluid absorber and scavenger (CFAS) sensor 49 monitors the amount of CF located within enclosure 10 (e.g. package 20) such as $H_2S$, $SO_2$, Cl, other halogens, and other gases or liquids noted herein above, and serves to protect metal article 30 from corrosion. With the passage of time, in corrosive environments some of the corrosive compounds will likely penetrate enclosure 10 and condense on the metal article and commence corrosion thereof. To prevent this situation, upon sensing a programmed, predetermined high amount of corrosive compounds within enclosure 10, a signal will be sent from corrosive fluid sensor 49 to microprocessor 60. Microprocessor 60 is pre-programmed so that during the duration of protecting metal article 30 from corrosion, it will respond by emitting a predetermined or programmed amount of one or more CFAS (corrosion fluid absorbers or scavengers) from CFAS dispenser 59 to return the enclosure to low, safe levels. In this situation, the CFAS dispenser 59 can include the one or more scavenger or absorber compounds noted above.

The predetermined amount is released through a proportional valve located on CFAS dispenser 59, not shown. Once the amount of CFAS has been emitted to enclosure 10, the valve is automatically closed and remains closed until the next desired discharge of anti-corrosion compounds.

Alternatively, or in conjunction with CFAS dispenser 59, microprocessor 60, as noted, can be programmed upon detecting a predetermined high level of CF to release different amounts of VCI from dispenser 55, depending upon various parameters known to the art such as the size of the metal article, the surface area thereof, the non-metal article, volume of enclosure 10, the amount of the CF, expected external conditions such as temperature, corrosive environment, relative humidity, and the like. Alternatively, or in conjunction with the CFAS, various predetermined amounts of SCI can be released from dispenser 55 to abate and eliminate the various CF. Once again, the microprocessor 60, can be programmed to release sufficient amounts of SCI, and/or VCI, to achieve a non-corrosive environment within enclosure 10. Such predetermined amounts can be determined based upon the above-noted factors such as surface area of the metal article, the amount of the CF, etc.

In summary, corrosion protection is obtained through the use of various different types of sensors located within the corrosion protection enclosure system including relative humidity sensors, temperature sensors of the metal, and of the temperature within the enclosure, relative humidity (RH) sensors 41, corrosive-causing fluid (CF) sensors, VCI sensors, SCI sensors, and the like. The one or more sensors transmit the level of content of the sensed item to a microprocessor. The microprocessor can be formatted, programmed, etc., utilizing one or more of the sensor predetermined (tripping point) values to have one or more abating dispensers, that is a dispenser that can treat, neutralize, or react with the one or more corrosion compounds to establish a corrosion-free environment within the enclosure system. In determining the abating type of anti-corrosive compound to dispense, the microprocessor can also contain various databases with regard to transient enclosures that include journey maps, duration times, packaging types of materials, climate conditions along the journey path, time blocks for each region, location including stop time such as overnight, and non-movement. Thus, the corrosion protection enclosure system, either transient or stationary, upon receiving information from one or more sensors via a microprocessor can dispense one or more dispensing compounds to establish a corrosion-free environment within the enclosure.

The invention would be better understood by the reference to the following drawings which serve to illustrate, but not to limit, the scope of the present invention. The above description, guidelines, parameters, etc., with regard to making and using the invention are hereby incorporated by reference.

In the drawings, sensors are denoted by code letters within a circle, whereas dispensers are noted by other code letters within a rounded rectangle. With respect to sensors, RH is relative humidity, Tm is temperature of the metal, Te is the temperature of the environment, i.e., temperature within the enclosure outside of the metal equipment, PH is a pH sensor, VCI is volative corrosion inhibitor(s), and CF is a corrosive fluid sensor often detecting specific corrosive fluids such as $SO_2$, $H_2S$ or Cl, etc. With respect to the dispensers, DH is dehumidifying compound(s), VCI is volative corrosion inhibitor(s), SCI is soluble corrosion inhibitor(s), PH is a pH regulator and CFAS is a corrosive fluid absorber or scavenger dispenser for treating various corrosive compounds as noted above, e.g. $SO_2$, $H_2S$ $H_2CO_3$, etc.

It is to be understood that when a particular Figure contains two or more sensors and two or more dispensers, the computer can be programmed so that one such sensor can be utilized to effect the use of one dispenser or any combination of the noted multiple abating dispensers. Similarly, when two or more sensors or utilized, the computer can be programmed to utilize only one dispenser, but generally two or more dispensers are utilized. In summary, the various sensors and the various dispensers can be utilized independently of each other. Thus, the microprocessor can be programmed to have a great number of combinations utilizing one or more sensors to effect utilizing one or more dispensers to maintain a corrosion free environment within enclosure 10. However, generally one sensor is typically utilized with regard to one related dispenser, for example, an RH sensor is utilized with a DH dispenser, a VCI sensor is utilized with a VCI dispenser, or a SCI dispenser, or both, a corrosive gas sensor 49 is utilized with a corrosive fluid absorber or scavenger dispenser 59, and Tm and Te sensors are utilized with a DH dispenser, or a VCI dispenser, or a SCI dispenser, or any combination thereof.

With regard to the attached figures, while only one sensor or dispenser may be shown in the various Figures, it is to be understood that one or more of the same can be utilized. For example, and often depending upon the size of the equipment and package, two or more RH (relative humidity) sensors can be utilized as well as two or more DH (dehumidifying compounds) dispensers, etc.

With regard to all of the drawings and in all systems, the microprocessor with respect to all sensors, monitors the same to determine if a predetermined level (value) of the indicated item (e.g., RH, VCI, etc.) has been reached and upon detecting the same, sends a signal to the appropriate dispenser to deliver in the enclosure the required type and amount of corrosion protection compound that eliminates or decreases the corrosion rate.

FIG. 1.1—In warehouses with a controlled environment, the corrosion depends on the following sensing parameters: relative humidity (RH), the temperature of metal ($T_m$) and atmosphere/environment ($T_e$). When the temperature of the metal part of equipment becomes less than the atmosphere temperature, condensation and corrosion increase.

To provide corrosion protection, the microprocessor checks the Tm and Te, RH, and VCI sensors and, depending on their levels, sends to the dispenser a signal to deliver the required amount (concentration) of VCI.

FIG. 1.2—In a rural environment the corrosion rate depends on environmental conditions. The level of RH and temperature can cause frequency change over a wide range. When the temperature of the metal part (Tm) of equipment becomes less than the Te, condensation and corrosion can occur. Alternatively, to provide corrosion protection, the microprocessor checks the temperature (Te, Tm) and RH, and depending on their parameter levels, sends to the dispensers a signal to deliver the required concentration of VCI and/or SCI. Alternatively, only DH can be applied to decrease the RH, or in combination with VCI, or SCI, or both.

FIG. 1.3—In an industrial environment, in addition to the steps described in FIG. 1.2, the corrosion rate can also depend on the concentration of corrosion fluids (CF), $H_2S$, and $SO_2$, for example.

To provide corrosion protection, the microprocessor checks CF sensors 49, and, depending on their parameter levels, sends a signal to the CFAS dispensers 59 a signal to deliver the required concentration of one or more CFAS compounds. Alternatively, RH and VCI sensors 41 and 45 respectively can be utilized with respect to dispensing one or more dehumidifying compounds 51 and/or one or more VCI compounds 55.

FIG. 1.4—The corrosion rate can also depend on the concentration of salts or water and ionized components thereof such as Cl.

To provide corrosion protection, the microprocessor checks the temperatures (Te, Tm), VCI, RH, Cl and, depending on their parameter levels, sends to the dispensers a signal to deliver the required concentration of VCI and/or SCI. Also, only DH can be applied to decrease the RH, or in combination with VCI, or SCI, or both.

FIG. 1.5—The corrosion rate can also depend on the concentration of corrosive gases, $H_2S$, $SO_2$, and Cl, for example.

To provide corrosion protection, the microprocessor checks the temperatures (Te, Tm), RH, CF and, depending on their parameter levels, sends to the dispensers a signal to deliver the required concentration of CFAS, or also VCI and/or SCI. Also, DH can be applied to decrease the RH.

FIG. 2.1—In warehouses with a controlled environment, the corrosion depends on the following sensing parameters: relative humidity (RH), the temperatures, i.e., of the metal (Tm) and atmosphere/environment (Te). When the temperature of the metal part of equipment becomes less than the atmosphere temperature, condensation and corrosion increase.

To provide corrosion protection, the microprocessor checks the Tm and Te, RH and depending on their levels sends to the dispenser a signal to release sufficient DH to decrease the RH to a level where condensation cannot occur.

FIG. 2.2—In a rural environment, the corrosion depends on the following sensing parameters: relative humidity (RH), the temperature of metal (Tm) and atmosphere/environment (Te) that can decrease the pH of a condenser layer to less than 7. When the temperature of the metal part of equipment becomes less than in the atmosphere, condensation and corrosion can Occur.

To provide corrosion protection, the microprocessor checks the Tm and Te, RH and depending on their levels sends a signal to release an effective amount of DH compound so that condensation cannot occur and the pH is close to the neutral (7). A VCI can also be released.

FIG. 2.3—In an industrial environment, the corrosion rate can depend upon the concentration of the various corrosive gases such as $H_2S$, $SO_2$ and the like. The corrosion protection enclosure system of FIG. 2.3 also contains various CF (specific) sensors as shown. As previously noted, generally a specific corrosion sensor has a corresponding corrosion abating dispenser that reduces or eliminates the noted corrosive agent. Thus, with respect to FIG. 2.3 wherein sensor $H_2S$ (a specific corrosion fluid sensor) detects an excessive predetermined amount of hydrogen sulfide, the microprocessor upon sensing an excessive amount sends a signal to CFAS dispenser 59 to deliver a sufficient concentration to reduce or eliminate the excessive level thereof. Similarly, upon the $SO_2$ sensor (another specific corrosion fluid sensor) sensing an excessive, predetermined amount of $SO_2$, a signal is sent by the microprocessor to CFAS dispenser 59 to deliver a sufficient amount of material thereof to the equipment package to abate or eliminate the $SO_2$ gas. The same analogy also applies to VCI sensor, not shown, and the VCI dispenser, as well as with regard to RH sensor and DH dispenser. As previously noted, the Tm and the Te temperature sensors are generally utilized to send a signal to DH dispenser to release dehumidifying compounds to the package.

FIG. 2.4—The corrosion protection system of FIG. 2.4 is very elaborate and contains one more specific sensors for detecting Cl, $H_2S$, $SO_2$, as well as other corrosive fluids or compounds. Upon detection of any one of said corrosive compounds, when the microprocessor senses an amount above a specific, predetermined level of the various corrosive fluid, except for VCI sensors and SCI sensors 49 that is below a predetermined level, the microprocessor will activate the corresponding dispenser, e.g. 59, to apply effective amounts of compounds to abate or eliminate the corrosive compound, or also to increase the amount of VCI and/or SCI. The various Te and Tm sensors and RH sensor can also be used to monitor the likelihood of corrosion and dispense DH or other compounds.

The embodiments of FIGS. 3.1 and 3.2 relate to a microprocessor, as generally described hereinabove and fully incorporated by reference, that is, connected with two or more enclosure systems 10 containing corrosion protective packages 20 that contain a metal article 20, e.g. equipment therein. The enclosures are as described hereinabove and fully incorporated by reference, and contain one or more sensors, one or more dispensers, and the like, with each enclosure, independently, communicating with the microprocessor with regard to detection of various compounds within the enclosure and subsequently, the microprocessor sending one or more signals to one or more dispensers to release effective amounts of the various corrosion inhibitors, or increase the amounts of one or more RH, VCI, SCI or CFAS dispensers, or any combination thereof, to alleviate, abate, reduce or eliminate corrosion in the enclosure. In a manner well known to the art and to the literature, the microprocessor is programmed so that it independently communicates with the two or more enclosures but that each communication is independent of the other enclosures. That is, with regard to a first enclosure, the microprocessor is programmed to only respond and send a signal to the first enclosure upon receiving a signal from one or more sensors thereof, and not to any other enclosures. Similarly, and independently, the microprocessor will respond only to signals received from one or more sensors only in the second enclosure and not to any other enclosure. The same situation is true with remaining enclosures. Thus, FIGS. 3.1 and 3.2 depict embodiments of the present invention where multiple enclosures containing equipment, articles, machinery and the like are protected within a package. Desirably, the various enclosures are in close proximity to one another during the shipping process and can be located within the same shipping container, box, crate, or the like.

As a guide with regard to programming microprocessor 60, FIG. 4 shows the corrosive rate of carbon steel with regard to relative humidity. As apparent from FIG. 4, when relative humidity generally exceeds about 60%, the corrosion rate dramatically increases. Thus, microprocessor 60 can be programmed to commence release of various desiccants at about 60% relative humidity or lower, about 50% or lower, or about 40% or lower.

FIG. 5 shows that upon an increase of the corrosion inhibitor concentration, the rate of corrosion is dramatically reduced.

As examples for corrosion protection in atmospheric environment that can contain one or different contaminants including $O_2$, $H_2S$, $CO_2$, Cl, the following types of CFAS inhibitors to protect from corrosion parts based on:

Fe and it alloys—Hydrazines, Amides, Amines, Pyridine, Imidazoline, Ethylamine, Monoethanolamine, Triethanolamine, Nitrite, Molybdates Cu and it alloys—Benzimidazole, Benzotriazoles, Thiourea, Thiazoles Al and it alloys—Ketones, Sulfoxides, Naphtalene, Thiourea, Thiazoles FIG. 6 relates to a comparison of relative humidity levels with respect to corrosive gases of $H_2O$, $SO_2$, Cl, upon carbon steel. At relative levels of about 50% or less, relative corrosion rate is small. However, at levels greater than 50%, as shown, the corrosion level is dramatically increased. Thus, microprocessor 60 can be programmed to admit corrosion inhibitors such as CFAS and/or anti-corrosion compounds when the relative humidity level is, for example, about 45%.

Corrosion rates have also been calculated with regard to various seaside environments as set forth in FIG. 7. Thus, when packages will be transferred or delivered within close proximity to an ocean such as within about 500 meters or less, or maintained on an ocean going ship, the microprocessor can increase the amount of VCI and/or CFAS inhibitors to meet the high corrosive environment. The type and amount of VCI, CFAS, etc., is selected depending environment condition, temperature and metals to be protected from corrosion.

As apparent from FIG. 8, when the enclosure containing a package encounters corrosive environments such as industrial, seaside, and marine, the required amount of one or more VCI and/or SCI compounds within the VCI, SCI, and/or CFAS compounds will be much higher than normal.

FIG. 9 relates to the fact that when Delta T is high, that is when the temperature of the environment within the enclosure is greater than that of the metal, condensation occurs at a greater rate than when the temperature of the metal is essentially the same as that of the atmosphere.

The invention will be better understood by reference to the following example that serves to explain and illustrate the invention but not to limit the scope thereof.

A hypothetical example relates to a plurality of piston rings to be manufactured at one location and then shipped to an engine assembly plant many miles away that will take several days due to the layover of a train. Initially, the piston rings are packed within package 20 having a low WVTR enclosure 10 such as a polyethylene polymer. Enclosure 10 contains relative humidity sensor 41 therein, VCI sensor 45 therein, metal temperature sensor 42, and enclosure temperature sensor 43, as well as microprocessor 60 therein. These sensors can be attached to the inside of enclosure 10 or they can merely be attached to the surface or package 20. Also located within enclosure 10 is dehumidifier (DH) dispenser 51 and VCI dispenser 55. Based upon average weather conditions, such as days of low humidity and days of high humidity conditions such as rain, a predetermined amount of one or more VCIs is placed in VCI dispenser 45 along with an additional safety factor amount thereof. Similarly, a predetermined amount of one or more desiccants is placed in DH dispenser 51 along with an additional safety factor amount thereof, etc. Enclosure 10 is then closed and the package is delivered from the factory to a railroad company. Upon arrival, it is placed within a railroad car. Assuming that the same occurs within a day under average summer temperatures and medium humidity, relative humidity sensor 41, VCI sensor 45, and metal temperature sensor 42 all give feedback to microprocessor 60 that determines all is well.

Upon traveling to the assembly plant located hundreds of miles away, the train encounters high humidity (heavy rain) conditions at average temperatures. Although the permeability of enclosure 10 is low, the relative humidity therein can increase. Microprocessor 60 that constantly monitors all sensors, detects an increase in humidity above a predetermined level for the protection of the piston ring. Accordingly, microprocessor 60 sends a signal to DH dispenser 51 that releases one or more desiccants in a predetermined amount to lower the relative humidity back to original shipping conditions. Upon release of a sufficient amount of desiccant, DH dispenser 51 via a proportional valve, terminates release of the one or more desiccants. Alternatively, or simultaneously, microprocessor 60 can send a signal to VCI dispenser 45 to open a proportional valve and release a predetermined amount of a VCI therein that applies a corrosion inhibitor vapor to the metal surface and counteracts the excess humidity. Once the predetermined amount of the VCI has been released, the proportional valve within a VCI dispenser is closed. Within a few days, package 20 containing the piston rings therein reaches its factory destination, but due to various circumstances, for example a strike by engine assembly plant workers, package 20 is retained for several days. The environment of the engine plant is an arid, hot location and possibly corrosive, and thus, after a few days, VCI will migrate out of the enclosure and the VCI level therein will drop. Being ever vigilant, microprocessor 60 will detect via VCI sensor 41 that the amount of VCI vapor within package 20 is below a predetermined level. Thus, microprocessor 60 will smartly and diligently send a signal to VCI dispenser 55 to release a predetermined amount that will bring the amount of the VCI vapor within package 20 to an acceptable protected level.

Subsequently, the strike is ended, and the piston rings within package 20 have been adequately protected, and are corrosion free and subsequently assembled onto a piston for an engine.

In a similar matter, the smart on-demand controlled release corrosion protection system of the present invention will handle similar or different detrimental shipping conditions such as low VCI levels, high humidity, high or low temperatures, detrimental corrosive fluids (CF) derived from corrosive atmospheres as in a warehouse, and the like. All of these detrimental aspects will be handled by microprocessor 60 that has been programmed to meet generally all variable detrimental conditions that package 20 can possibly encounter.

In summary, the corrosion protection systems of the present invention are designed through programming of microprocessor 60 to handle the following situations:

Low VCI vapor levels within package 20 that can be caused by release of a vapor through a low porous enclosure 10, minor leaks such as an aperture within the enclosure, and the like. With the amount of VCI vapors high, nothing need be done since the metal article remains protected.

High humidity conditions as due to a humid environment caused by rainy days, tropical conditions, and the like. Low humidity conditions require no response since the metal remains protected.

Similarly, should high amounts of corrosive gases such as $SO_2$, $H_2S$, or Cl enter package 20 due to a corrosive environment such as within a factory, building, and the like, microprocessor 60 is programmed upon detecting a minimum amount of such corrosive gases, to send CFAS dispenser 59 (corrosion fluid absorber or scavengers) a signal to emit a predetermined amount of one or more anticorrosion compounds to restore the internal environment of package 10 to normal conditions. Low amounts of corrosive fluid require no response since the metal article remains protected.

Thus, the smart on-demand controlled release corrosion protection packaging systems of the present invention can meet numerous environments and maintain the internal environment of package 20 under normal protective conditions over extended periods of time from the different noted detrimental environments.

In summary, the present invention can be utilized for at least the following scenarios:

Predesigned and programmed deliverance of DH, VCI or SCI, or any combination thereof, with effective types and amounts from specific devices wherein:
  a. Journey map and duration times are well known; and
  b. Packaging type and materials used are well known;
  c. Good information exists with respect to:
    i. Climate conditions and durations along the path of journey;
    ii. Time blocks for each region with known environmental and climate conditions; and
    iii. Storage locations, durations and known environmental and climate conditions.

The smart design on-demand systems of the present invention to supply necessary protection to smart packages can be utilized where:
  a. Journey maps and duration of events (storage, traveling, etc.) are well known but may be changed;

b. Commercially available sensors are installed to continuously sense environmental ($SO_2$, $H_2S$, CI, and others) and climate (temperature, RH, etc.) conditions;

c. Sensors are used to continuously send information of readings (T, RH, $SO_2$, $H_2S$, CI, etc.) to preprogrammed process controllers (Proportional, P, Proportional and Differential, PD and Proportional, Integral and differential, PID).

d. Process controllers are used to open (programmed as a function of set points) and close specific VCI and SCI devices as dictated by the program of the controllers While in accordance with the Patent Statutes, the best mode and preferred embodiments have been set forth, the scope of the invention is not limited thereto, but rather by the scope of the attached claims.

What is claimed is:

1. A transient protection system for maintaining an on-demand, long-term corrosion-free environment, comprising:
a self-contained, transient corrosion protection enclosure capable of containing a metal article,
said enclosure being free of any external power source;
said enclosure having at least one sensor therein, said sensor comprising:
at least one relative humidity sensor for sensing the relative humidity in said enclosure, at least one temperature sensor for sensing the temperature in said enclosure, at least one volatile corrosion inhibitor sensor for sensing the amount of volatile corrosion inhibitor vapor in said enclosure, or at least one corrosion fluid sensor for sensing the amount of a corrosive fluid in said enclosure, or any combination thereof;
said enclosure having at least one corrosion abating dispenser, said dispenser comprising:
at least one dehumidifier dispenser located either inside said enclosure or outside said enclosure and having at least one dehumidifying compound therein, or at least one volatile corrosion inhibitor dispenser located either inside said enclosure or outside said enclosure and having at least one volatile corrosion inhibitor therein, or at least one soluble corrosion inhibitor dispenser located either inside said enclosure or outside said enclosure and having at least one soluble corrosion inhibitor therein, or at least one corrosive fluid absorber and scavenger dispenser located either inside said enclosure or outside said enclosure and having at least one corrosive fluid absorber and scavenger therein, or any combination thereof;
a microprocessor, said microprocessor, independently, being operatively connected to said at least one relative humidity sensor, or to said at least one temperature sensor, or to said at least one volatile corrosion inhibitor sensor, or to said at least one corrosion fluid sensor, or any combination thereof;
said microprocessor, independently, being operatively connected to said at least one dehumidifying compound dispenser, or said at least one volatile corrosion inhibitor dispenser, or at least one soluble corrosion inhibitor dispenser, or said at least one corrosive fluid absorber and scavenger dispenser, or any combination thereof; and
said microprocessor being self-controlled and programmed so that, independently, upon receiving a signal from any of said sensors that the amount of the detected item thereof is abnormal being capable of energizing said one or more corrosion abating dispensers and releasing predetermined different amounts of said at least one corrosion abating dispensing compound into said enclosure.

2. The transient protection system of claim 1, wherein at least two different types of said sensors exist and wherein said enclosure contains at least two different types of corrosion abating dispensers.

3. The transient protection system of claim 1, wherein at least three different types of said sensors exist; wherein said enclosure contains at least three different types of corrosion abating dispensers; and wherein said external power source is electricity.

4. The transient protection system of claim 1, wherein at least one said relative humidity sensor, at least one said temperature sensor, and at least one said volatile corrosion inhibitor sensor is located within said enclosure, wherein at least one said relative humidity dispenser and at least one said volatile corrosion inhibitor dispenser is located within said enclosure, and wherein said microprocessor is located within said enclosure.

5. The transient protection system of claim 4, wherein said dehumidifying compound comprises aerogel, activated alumina, benzophenone, clay, calcium chloride, lithium bromide, lithium chloride, magnesium perchlorate, molecular sieve, or silica gel, or any combination thereof; wherein said volatile corrosion inhibitor comprises a triazole or a derivative thereof, benzoate or a derivative therein, a salt of benzoic acid, carbamate, alkali metal molybdate, dimolybdate, an amine molybdate or a salt thereof, an organic nitrite, an alkali metal nitrite, or alkali dibasic acid salt, or any combination thereof; and wherein said soluble corrosion inhibitor comprises an organic nitrite, borate, organic aminophosphite, phosphate, polyphosphate, silicate, potassium hydroxide, sodium hydroxide, an amine base compound, a sulfonate, zinc sulfate, or calcium bicarbonate, or any combination thereof.

6. A transient protection system for maintaining an on-demand, long-term corrosion-free environment, comprising:
a self-contained transient corrosion protection enclosure capable of containing a metal article;
said enclosure being free of any external power source;
said enclosure having at least one relative humidity sensor for sensing the relative humidity in said enclosure;
at least one corrosion abating dehumidifier dispenser having at least one dehumidifying compound therein, said dehumidifier dispenser being located inside said enclosure or outside said enclosure;
a microprocessor, said microprocessor being operatively connected to said at least one relative humidity sensor, and being operatively connected to said at least one dehumidifier dispenser;
said microprocessor being self-controlled and programmed so that, independently, upon receiving a signal from said relative humidity sensor that the relative humidity in said enclosure is above a specific value, being capable of energizing said dehumidifier dispenser and releasing predetermined different amounts of at least one said dehumidifying compound into said enclosure.

7. The transient protection system of claim 6, wherein said enclosure further includes at least one temperature sensor for sensing the temperature in said enclosure, said microprocessor being operatively connected to said at least one temperature sensor;
said microprocessor being self-controlled and programmed so that, independently, upon receiving a signal from said temperature sensor that said temperature in said enclosure is above a specific value, being capable of energizing said dehumidifier dispenser and releasing predetermined different amounts of at least one said dehumidifying compound into said enclosure;

wherein said dehumidifying compound comprises an aerogel, activated alumina, benzophenone, clay, calcium chloride, lithium bromide, lithium chloride, magnesium perchlorate, molecular sieve or silica gel, or any combination thereof; and wherein said external power source is electricity.

8. The transient protection system of claim 6, wherein said enclosure further includes at least one volatile corrosion inhibitor sensor for sensing the amount of volatile corrosion inhibitor vapor in said enclosure;

at least one corrosion abating volatile corrosion inhibitor dispenser located either inside said enclosure or outside said enclosure and having at least one volatile corrosion inhibitor therein;

said microprocessor being operatively connected to said at least one volatile corrosion inhibitor sensor and said microprocessor being operatively connected to said at least one volatile corrosion inhibitor dispenser; and said microprocessor being self-controlled and programmed so that, independently, upon receiving a signal from said volatile corrosion inhibitor sensor that the amount of said volatile corrosion inhibitor vapor in said enclosure is below a specific value, being capable of energizing said volatile corrosion inhibitor dispenser and releasing predetermined different amounts of at least one said volatile corrosion inhibitor into said enclosure.

9. The transient protection system of claim 8, wherein said enclosure further includes at least one temperature sensor for sensing the temperature in said enclosure;

said microprocessor being operatively connected to said at least one temperature sensor;

said microprocessor being self-controlled and programmed so that, independently, upon receiving a signal from said temperature sensor that said temperature in said enclosure is above a specific value, being capable of energizing said dehumidifier dispenser and releasing predetermined different amounts of said at least one dehumidifying compound into said enclosure; or said microprocessor being self-controlled and programmed so that, independently, upon receiving a signal from said temperature sensor that said temperature in said enclosure is above a specific value, being capable of energizing said volatile corrosion inhibitor dispenser and releasing predetermined different amounts of said at least one volatile corrosion inhibitor into said enclosure; or both.

10. The transient protection system of claim 9, wherein said volatile corrosion inhibitor comprises a triazole or a derivative thereof, benzoate or a derivative therein, a salt of benzoic acid, carbamate, alkali metal molybdate, dimolybdate, an amine molybdate or a salt thereof, an organic nitrite, an alkali metal nitrite, or an alkali dibasic acid salt, or any combination thereof, and wherein said dehumidifying compound comprises an aerogel, activated alumina, benzophenone, clay, calcium chloride, lithium bromide, lithium chloride, magnesium perchlorate, molecular sieve or silica gel, or any combination thereof.

11. The transient protection system of claim 7, wherein said enclosure includes at least one soluble corrosion inhibitor sensor for sensing the amount of soluble corrosion inhibitor in said enclosure;

including at least one corrosion abating soluble corrosion inhibitor dispenser located either inside said enclosure or outside said enclosure and having at least one soluble corrosion inhibitor therein;

said microprocessor being operatively connected to said at least one soluble corrosion inhibitor sensor and to said at least one soluble corrosion inhibitor dispenser, said microprocessor being self-controlled and programmed so that, independently, upon receiving a signal from said soluble corrosion inhibitor sensor that the amount of said soluble corrosion inhibitor in said enclosure in below a specific value, being capable of energizing said soluble corrosion inhibitor dispenser and releasing predetermined different amounts of said at least one soluble corrosion inhibitor into said enclosure, and wherein soluble corrosion inhibitor compound comprises an organic nitrite, borate, organic aminophosphite, phosphate, polyphosphate, silicate, potassium hydroxide, sodium hydroxide, an amine base compound, a sulfonate, zinc sulfate, or calcium bicarbonate, or any combination thereof.

12. A transient protection system for maintaining an on-demand, long-term corrosion-free environment, comprising:

a self-contained, transient corrosion protection enclosure capable of containing a metal article, said enclosure being free of any external power source;

said enclosure having at least one corrosion fluid sensor for sensing the amount of a corrosive fluid in said enclosure;

at least one corrosive fluid absorber and scavenger dispenser located either inside said enclosure or outside said enclosure and having at least one corrosive fluid absorber and scavenger therein;

said self-controlled microprocessor being operatively connected to said at least one corrosion fluid sensor and said microprocessor being operatively connected to said at least one corrosive fluid absorber and scavenger dispenser, said microprocessor being self-controlled and programmed so that upon receiving a signal from said corrosion fluid sensor that the amount of said corrosive fluid in said enclosure is above a specific value, being capable of energizing said corrosive fluid absorber and scavenger dispenser and releasing predetermined different amounts of at least one corrosive fluid absorber and scavenger compound into said enclosure.

13. The transient protection system of claim 12, wherein said enclosure further includes at least one relative humidity sensor for sensing the relative humidity in said enclosure, or said enclosure having at least one volatile corrosion inhibitor sensor for sensing the amount of volatile corrosion inhibitor vapor in said enclosure, or said enclosure having both said relative humidity sensor and said volatile corrosion inhibitor sensor;

said microprocessor being operatively connected to said at least one relative humidity sensor, said microprocessor being operatively connected to said at least one volatile corrosion inhibitor sensor;

at least one corrosion abating dehumidifying dispenser located either inside said enclosure or outside said enclosure and having at least one dehumidifying compound therein;

at least one corrosion abating volatile corrosion inhibitor dispenser located either inside said enclosure or outside said enclosure and having at least one volatile corrosion inhibitor compound therein;

said microprocessor being operatively connected to said at least one dehumidifier dispenser; said microprocessor being self-controlled and programmed so that, independently, upon receiving a signal from said relative humidity that said relative humidity in said enclosure is above a specific value, being capable of energizing said at least one dehumidifying disperser and releasing predetermined different amounts of at least one said dehumidifying compound into said enclosure; and said microprocessor being self-controlled and programmed so that, independently, upon receiving a signal from said volatile corrosion inhibitor sensor that the amount of said volatile corrosion inhibitor vapor in said enclosure is below a specific value, being capable of energizing said volatile corrosion inhibitor dispenser and releasing predetermined different amounts of at least one said volatile corrosion inhibitor compound into said enclosure; or both.

14. The transient protection system of claim 13, wherein said dehumidifying compound comprises aerogel, activated alumina, benzophenone, clay, calcium chloride, lithium bromide, lithium chloride, magnesium perchlorate, molecular sieve or silica gel, or any combination thereof; wherein said volatile corrosion inhibitor compound comprises triazole or a derivative thereof, benzoate or a derivative therein, a salt of benzoic acid, carbamate, alkali metal molybdate, dimolybdate, an amine molybdate or a salt thereof, alkali dibasic acid salt, an organic nitrite, an alkali metal nitrite, or any combination thereof; and wherein said external power source is electricity.

15. A transient protection system for maintaining an on-demand, long-term corrosion-free environment, comprising:
    a self-contained, transient corrosion protection enclosure capable of containing a metal article,
    said enclosure being free of any external power source,
    said enclosure having at least one temperature sensor for sensing the temperature in said enclosure; or said enclosure having at least one volatile corrosion inhibitor sensor for sensing the amount of volatile corrosion inhibitor vapor in said enclosure; or both;
    at least one corrosion abating volatile corrosion inhibitor dispenser located either inside said enclosure or outside said enclosure and having at least one volatile corrosion inhibitor therein;
    a microprocessor, said microprocessor being operatively connected to said at least one temperature sensor; or said microprocessor being operatively connected to said at least one volatile corrosion inhibitor sensor, or both;
    said microprocessor being operatively connected to said at least one volatile corrosion inhibitor dispenser;
    said microprocessor being self-controlled and programmed so that upon receiving a signal from said temperature sensor that said temperature is said enclosure is above a specific value, being capable of energizing said volatile corrosion inhibitor dispenser and releasing predetermined different amounts of said at least one volatile corrosion inhibitor into said enclosure, or said microprocessor being self-controlled and programmed so that, independently, upon receiving a signal from said volatile corrosion inhibitor sensor that the amount of volatile corrosion inhibitor vapor in said enclosure is below a specific value, being capable of energizing said volatile corrosion inhibitor dispenser and releasing predetermined different amounts of said at least one volatile corrosion inhibitor into said enclosure, or both.

16. The transient protection system of claim 15, wherein said volatile corrosion inhibitor comprises triazole or a derivative thereof, benzoate or a derivative therein, a salt of benzoic acid, carbamate, alkali metal molybdate, dimolybdate, an amine molybdate or a salt thereof, alkali dibasic acid salt, an organic nitrite, an alkali metal nitrite, or any combination thereof.

17. The transient protection system of claim 15, wherein said volatile corrosion inhibitor comprises a potassium nitrite, sodium nitrite, amine salt, benzoate, nitrobenzoate, carbonate, potassium carbonate, imidazolines, hexylamine, naphthalene, ammonia, benzotriazole, benzomidazole, or molybdate and any combination thereof.

18. A transient protection system for maintaining an on-demand, long-term corrosion-free environment, comprising:
    a self-contained, transient corrosion protection enclosure capable of containing a metal article,
    said enclosure being free of any external power source,
    an enclosure having at least one temperature sensor for sensing the temperature in said enclosure;
    at least one corrosion abating dehumidifier dispenser having at least one dehumidifying compound therein, said dehumidifying dispenser being located inside said enclosure or outside said enclosure; and at least one corrosion inhibiting volatile corrosion inhibitor dispenser located either inside said enclosure or outside said enclosure and having at least one volatile corrosion inhibitor therein;
    a microprocessor, said microprocessor being operatively connected to said at least one temperature sensor;
    said microprocessor being operatively connected to said at least one dehumidifier dispenser, and being operatively connected to said at least one volatile corrosion inhibitor dispenser;
    said microprocessor, being self-controlled and programmed so that upon receiving a signal from said temperature sensor that the temperature in said enclosure is above a specific value, being capable of energizing said dehumidifier dispenser and releasing predetermined different amounts of at least one dehumidifying compound into said enclosure; or said microprocessor, being self-controlled and programmed so that, independently, upon receiving a signal from said temperature sensor that said temperature in said enclosure is above a specific value, being capable of energizing said volatile corrosion inhibitor dispenser and releasing predetermined different amounts of at least one volatile corrosion inhibitor into said enclosure; or both.

19. The transient protection system of claim 18, wherein said dehumidifying compound comprises an aerogel, activated alumina, benzophenone, clay, calcium chloride, lithium bromide, lithium chloride, magnesium perchlorate, molecular sieve, or silica gel, or any combination thereof; and wherein said volatile corrosion inhibitor comprises a triazole or a derivative thereof, benzoate or a derivative thereof, salt of benzoic acid, carbamate, alkali metal molybdate, dimolybdate, an amine molybdate or a salt thereof, alkali dibasic acid salt, organic nitrite, alkali metal nitrite, or any combination thereof.

* * * * *